(12) United States Patent
Anvari

(10) Patent No.: US 10,861,608 B2
(45) Date of Patent: Dec. 8, 2020

(54) INTERNET OF THINGS (IOT) WITH NOVEL TIME OF DAY ACQUISITION

(71) Applicant: Kiomars Anvari, Walnut Creek, CA (US)

(72) Inventor: Kiomars Anvari, Walnut Creek, CA (US)

(73) Assignee: Kiomars Anvari, Walnut Creek, CA (US)

( * ) Notice: Subject to any disclaimer, the term of this patent is extended or adjusted under 35 U.S.C. 154(b) by 0 days.

(21) Appl. No.: 16/743,354

(22) Filed: Jan. 15, 2020

(65) Prior Publication Data

US 2020/0152340 A1    May 14, 2020

Related U.S. Application Data

(63) Continuation-in-part of application No. 15/071,910, filed on Mar. 16, 2016, now Pat. No. 10,591,590, and a continuation-in-part of application No. 16/386,124, filed on Apr. 16, 2019, now Pat. No. 10,580,301, and a continuation-in-part of application No. 16/109,700, filed on Aug. 22, 2018, now Pat. No. 10,542,508.

(51) Int. Cl.
| | |
|---|---|
| *G16Y 40/35* | (2020.01) |
| *G16Y 20/10* | (2020.01) |
| *G16Y 40/50* | (2020.01) |
| *H04L 29/08* | (2006.01) |
| *G16Y 10/75* | (2020.01) |
| *H04L 5/00* | (2006.01) |
| *H04L 27/26* | (2006.01) |
| *H04L 29/12* | (2006.01) |
| *H04J 3/06* | (2006.01) |

(52) U.S. Cl.
CPC .............. *G16Y 40/35* (2020.01); *G16Y 10/75* (2020.01); *G16Y 20/10* (2020.01); *G16Y 40/50* (2020.01); *H04L 67/125* (2013.01)

(58) Field of Classification Search
None
See application file for complete search history.

(56) References Cited

U.S. PATENT DOCUMENTS

| | | | | |
|---|---|---|---|---|
| 9,213,083 | B1 * | 12/2015 | Carter | ....................... G01S 5/10 |
| 10,580,301 | B2 * | 3/2020 | Anvari | ................... G01S 13/933 |
| 2011/0286560 | A1 * | 11/2011 | Pignatelli | .............. H04J 3/0655 375/356 |
| 2012/0026041 | A1 * | 2/2012 | Murdock | ................. G01S 11/08 342/387 |
| 2013/0308504 | A1 * | 11/2013 | Nimbalker | .............. H04L 5/001 370/281 |
| 2014/0233479 | A1 * | 8/2014 | Dahod | .................. H04W 76/27 370/329 |

(Continued)

*Primary Examiner* — Jay L Vogel

(57) ABSTRACT

Developing intelligent systems which take into consideration the economical, environmental, and safety factors of the modern society, is one of the main challenges of this century. Progress in the fields of mobile robots, control architectures, artificial intelligence, advanced technologies, and computer vision allows us to now envisage a smart environment future.
The rise of the connected objects known as the "Internet of Things" (IoT) will rival past technological marvels. This application discloses a time synchronous communication IoT network and use of time of day to control and manage a smart environment.

10 Claims, 26 Drawing Sheets

(56) References Cited

U.S. PATENT DOCUMENTS

| | | | |
|---|---|---|---|
| 2015/0055636 A1* | 2/2015 | Rausch | H04H 20/34 370/336 |
| 2015/0155891 A1* | 6/2015 | Soliman | H04L 27/2626 455/552.1 |
| 2015/0185713 A1* | 7/2015 | Glickfield | G05B 15/02 700/44 |
| 2017/0026144 A1* | 1/2017 | Zinner | H04L 63/1441 |
| 2018/0054487 A1* | 2/2018 | Hebsur | G06F 3/04847 |
| 2019/0007151 A1* | 1/2019 | Goel | H04J 3/0667 |
| 2019/0246351 A1* | 8/2019 | Yang | H04W 52/0216 |
| 2019/0335479 A1* | 10/2019 | Thubert | H04B 1/713 |

\* cited by examiner

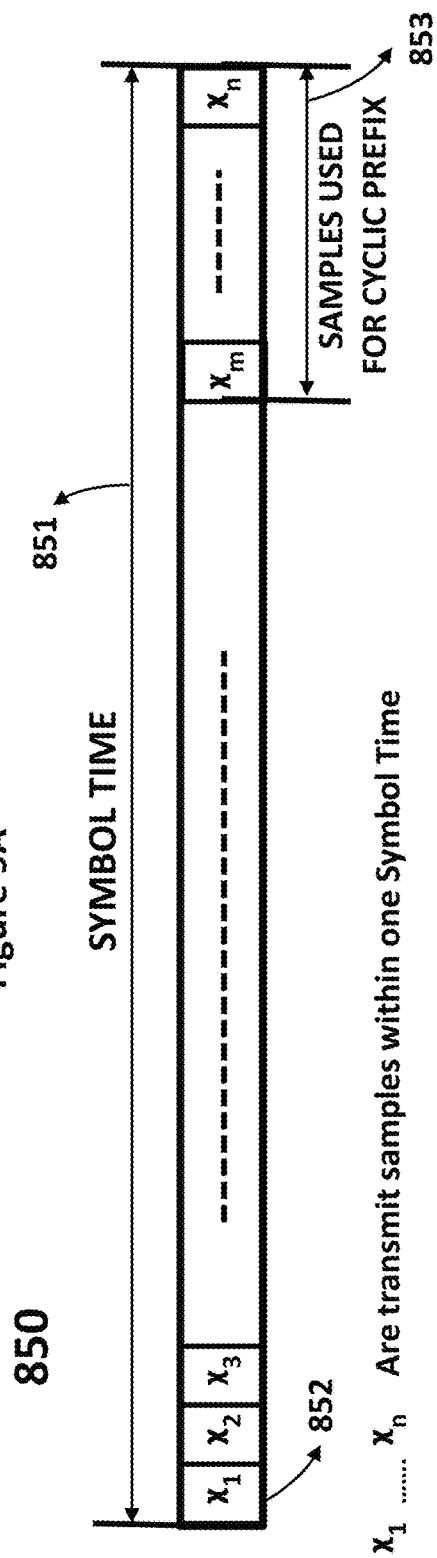
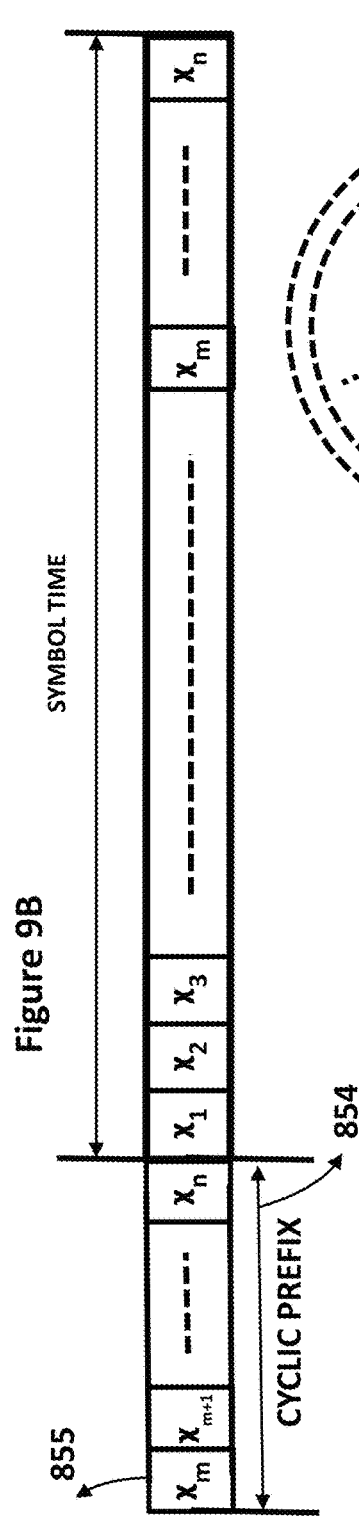
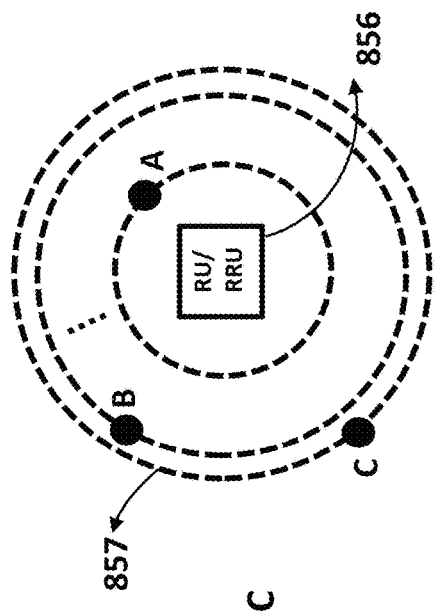
Figure 9A
Figure 9B
Figure 9C

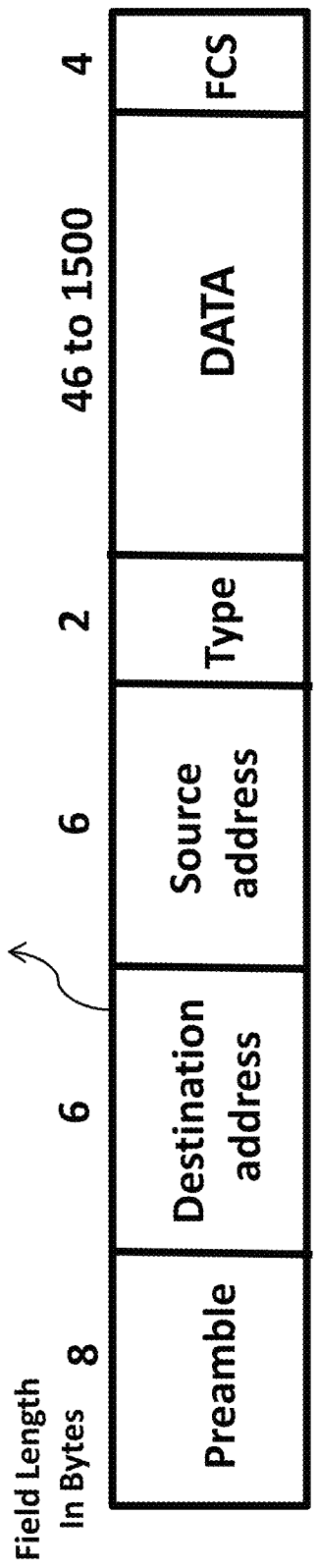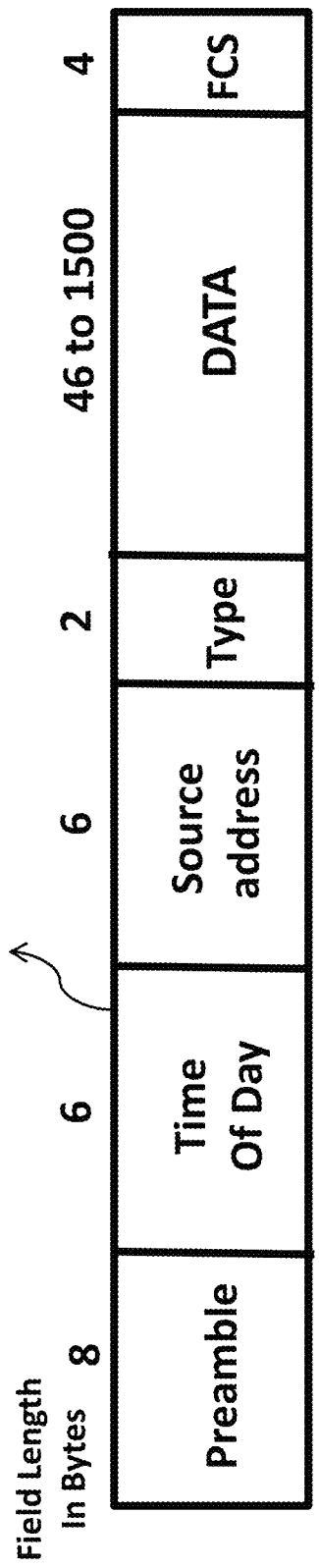
Figure 10

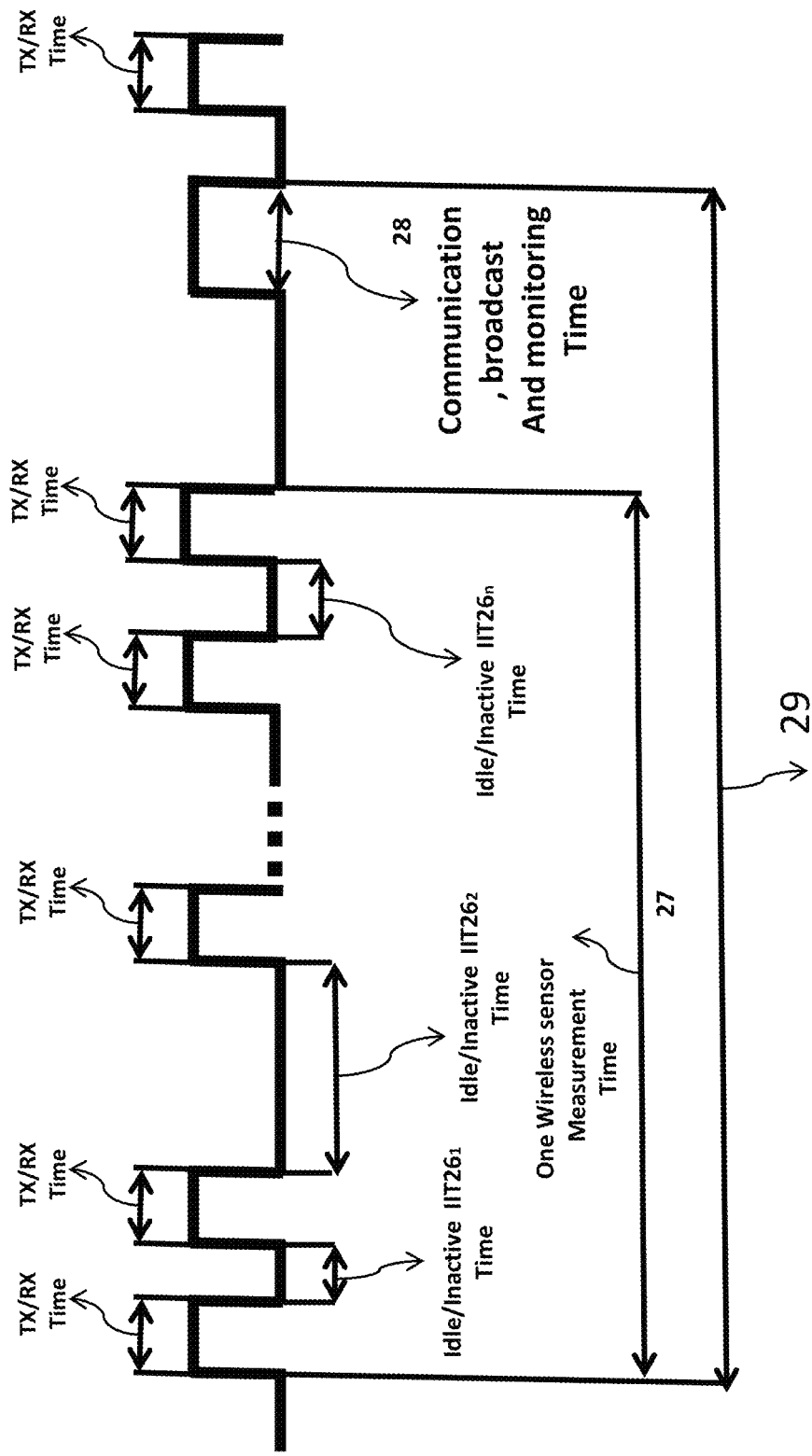

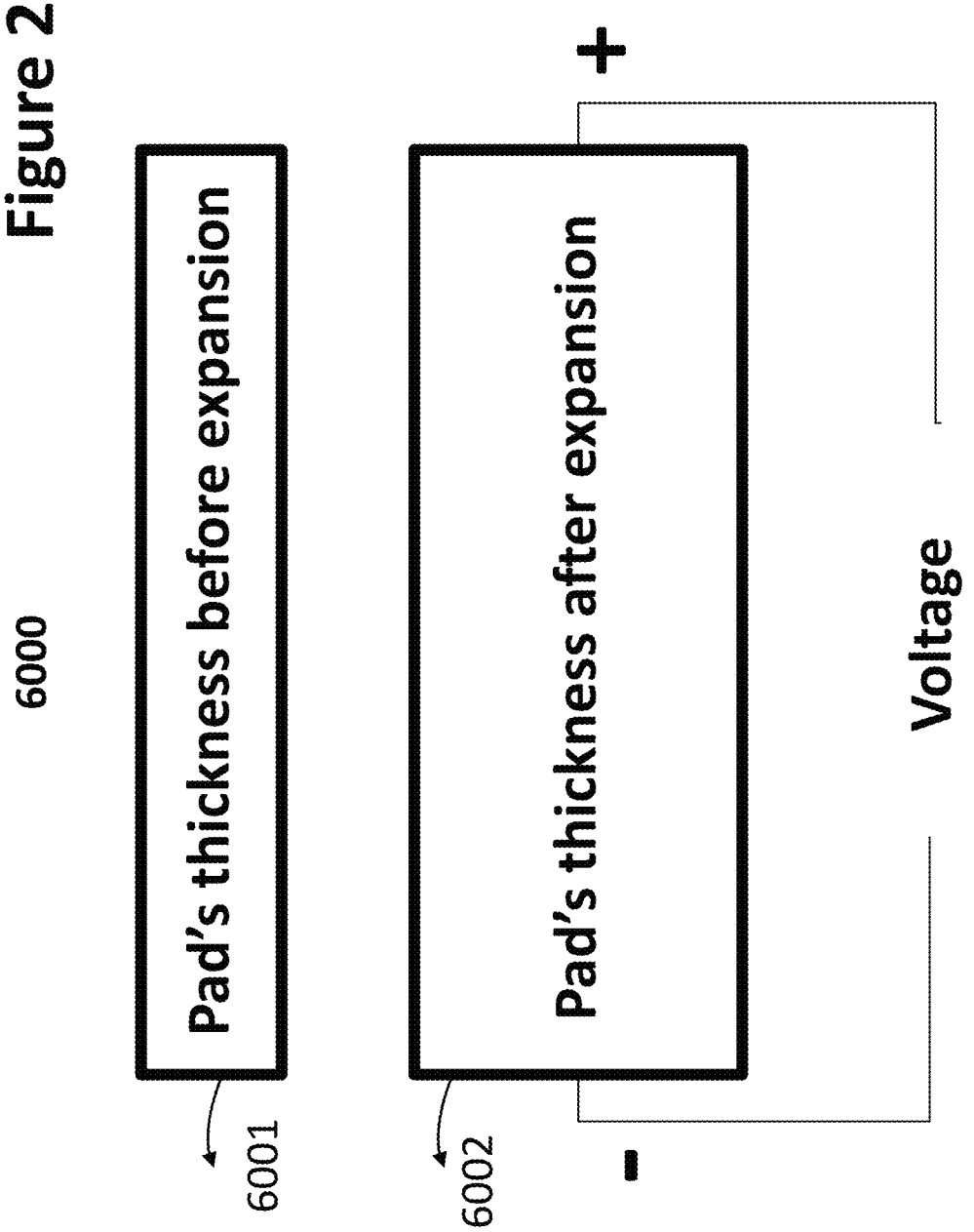

INTERNET OF THINGS (IOT) WITH NOVEL TIME OF DAY ACQUISITION

The application claims priority to the following related applications and included here is as a reference.

Application: U.S. patent application Ser. No. 15/071,910 filed Mar. 16, 2016 and entitled "A CONTROL ALGORITHM FOR WIRELESS SENSOR TO ESTIMATE AND CALCULATE ENVIRONMENTAL PARAMETERS".

Application: U.S. patent application Ser. No. 15/193,373 filed Jun. 27, 2016 and entitled "PROTECTION AND GUIDANCE GEAR OR EQUIPMENT WITH IDENTITY CODE AND IP ADDRESS".

Application: U.S. patent application Ser. No. 16/386,124 filed Apr. 16, 2019 and entitled "MOVING VEHICLES IN A SMART ENVIRONMENT".

Application: U.S. patent application Ser. No. 16/109,700 filed Aug. 22, 2018 and entitled "WIRELESS RADIO ACCESS NETWORKS WITH ASYNCHRONOUS FRONTEND".

BACKGROUND

Developing intelligent systems which take into consideration the economical, environmental, and safety factors of the modern society, is one of the main challenges of this century. Progress in the fields of mobile robots, control architectures, artificial intelligence, advanced technologies, and computer vision allows us to now envisage a smart environment future.

It is safe to say that we are at the start of another industrial revolution. The rise of the connected objects known as the "Internet of Things" (IoT) will rival past technological marvels, such as the printing press, the steam engine, and electricity. From the developed world to developing world, every corner of the planet will experience profound economic resurgence. Even more remarkable is the speed with which this change will happen. A decade ago there were about one billion devices connected to internet. Today, there are close to 20 billion. In five year, it could be close to 50 billion.

The rise of IoT also means we are at the start of a new age of data. Two chief components of an "IoT object" are its ability to capture data via sensors and transmit data via the Internet. The declining cost of sensors since the start of the new millennium has been a main driver in the rise of IoT. In short, sensors are dirt cheap today. This has profound implications on the ability to capture data.

The Internet of Things (IoT) describes a worldwide network of intercommunicating devices. Internet of Things (IoT) has reached many different players and gained further recognition. Out of the potential Internet of Things application areas, Smart Cities (and regions), Smart Car and mobility, Smart Home and assisted living, Smart Industries, Public safety, Energy & environmental protection, Agriculture and Tourism as part of a future IoT Ecosystem have acquired high attention.

The Internet of Everything (IoE) is a concept that aims to look at the bigger picture in which the Internet of Things fits. Yet, when you look deeper at IoE, you'll notice it really is also about the vision of a distributed network with a growing focus on the edge in times of ongoing decentralization, some digital transformation enablers and a focus on IoT business outcomes.

While the Internet of Things today mainly is approached from the perspective of connected devices, their sensing capabilities, communication possibilities and, in the end, the device-generated data which are analyzed and leveraged to steer processes and power numerous potential IoT use cases, the Internet of Everything concept wants to offer a broader view.

The IoT based smart environments represent the next evolutionary development step in industries such as construction, manufacturing, transportation systems and even in sporting goods equipment. Like any functioning organism, the smart environment relies first and foremost on IoT sensor data from the real world. Sensory data comes from multiple sensors of different modalities in distributed locations. The smart environment needs information about all of its surroundings as well as about its internal workings.

The challenge is determining the prioritized hierarchy of: (1) detecting the relevant quantities, (2) monitoring and collecting the data, (3) assessing and evaluating the information, and (4) performing decision-making actions. The information needed by smart environments is provided by Distributed Sensor Systems, which are responsible for sensing as well as for the first stages of the processing hierarchy.

New types of applications can involve the electric vehicle and the smart house, in which appliances and services that provide notifications, security, energy-saving, automation, telecommunication, computers and entertainment are integrated into a single ecosystem with a shared user interface. Obviously, not everything will be in place straight away. Developing the technology, demonstrating, testing and deploying products, it will be much nearer to implementing smart environments by 2020. In the future computation, storage and communication services will be highly pervasive and distributed: people, smart objects, machines, platforms and the surrounding space (e.g., with wireless/wired sensors, M2M devices, etc.). The "communication language" will be based on interoperable protocols, operating in heterogeneous environments and platforms. IoT in this context is a generic term and all objects can play an active role thanks to their connection to the Internet by creating smart environments, where the role of the Internet has changed.

$5^{th}$ generation wireless systems (5G) are on the horizon and IoT is taking the center stage as devices are expected to form a major portion of this 5G network paradigm. IoT technologies such as machine to machine communication complemented with intelligent data analytics are expected to drastically change landscape of various industries. The emergence of cloud computing and its extension to fog paradigm with proliferation of intelligent 'smart' devices is expected to lead further innovation in IoT.

The existing 4G (fourth generation) networks have been widely used in the Internet of Things (IoT) and are continuously evolving to match the needs of the future Internet of Things (IoT) applications. The 5G (fifth generation) networks are expected to massive expand today's IoT that can boost cellular operations, IoT security, and network challenges and driving the Internet future to the edge. The existing IoT solutions are facing a number of challenges such as large number of connection of nodes, security, and new standards.

The drive to minimize human interaction in transportation vehicles is stronger than ever, especially in public transportation, automobiles, and etc. For instant, just a few years ago, automobiles seldom had very sophisticated safety systems. Now, it is rare to find an automobile without various safety and protection systems. And now new technology is evolving to the point of being able to offer preventive methods to better manage and dissipate sudden impact energy to the vehicle.

Today internet of things is a new revolution of the internet. A world where the real, digital and the virtual are converging to create smart environments that make energy, transport, cities and many other areas more intelligent. Different types of application like water monitoring, water pollution, air pollution, forest fire detection, smart homes, smart cities where each things can connect from anywhere to anyplace to make our life easier.

In order to understand what are the constituents of IoE we will need to dive into the core parts of IoE. IoE is an umbrella term combining the following 4 properties in one place:

1. People:
People are the humans using connected devices to deliver insights about their personal and professional self. This data can include interests, preferences, work, personal health etc. Connecting this data to enterprise needs can provide insights relating the needs and desires of prospects for businesses. Additionally, this can be used to track performance and pain points of human resources.

2. Process:
The process is the way to ensure deliverability of right data at the right time to the right person or machine. Here data is more about insightful information or an action than just random chunk. Figuring out a way to decipher the right flow of information is a key to making the best use of big data.

3. Data:
With the increase in sources and types of data, we will also need to classify the information and analyze it to bring useful insights. Data alone is nothing but once combined with analytics and analysis this new data can help businesses in decision making and managing the organization.

4. Things:
This is where we come across the term Internet of Things (IoT). Internet of things is the interconnectivity of devices that send and receive information across networks like the internet. With every signal injected into the network, data is generated which needs to be collected, summarized and analyzed efficiently.

This application discloses a time synchronous communication IoT network and use of time of day to control and manage a smart environment.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one aspect, an IoT network uses distributed IoT devices which are sensor/monitoring devices to monitor its surrounding environment and detect and collect data to be processed by the IoT network.

In another aspect, an IoT device is a flying object.
In another aspect, an IoT device is a moving object.
In one aspect, an IoT is a robot.
In another aspect, an IoT device is equipment or a tool.
In one aspect, the IoT can be used for a protection system.
In one aspect, the protection system can be used by various moving objects, flying vehicles/objects and stationary objects in order to protect them from any collision.
In another aspect, all communication links in the IoT network are asynchronous and use Ethernet packet protocols.

In one aspect, an IoT device uses Ethernet packet protocol for the over the air link between IoT network and IoT device.

In one aspect, the IoT devices use IEEE1588 (institute of electrical and electronic engineering 1588) precision time protocol (PTP) to achieve clock synchronization and obtain a time of day.

In another aspect, the IoT device uses IEEE1588 PTP obtain time of day from the IoT network (4G, 5G, and WiFi networks).

In one aspect, an IoT device uses IEEE1588 PTP to obtain time of day from another IoT device.

In another aspect, the IoT device uses GPS (Global Positioning System) receiver to obtain location and time of day.

In one aspect, the IoT device frequency and phase synchronizes to IoT network using 4G, 5G, and WiFi (wireless fidelity) air protocol.

In another aspect, the IoT network through downlink cyclic prefix in 4G, 5G, and WiFi transmit symbol sends the time of day to IoT device with nanoseconds accuracy.

In one aspect, one sample in 4G, 5G, and WiFi transmit cyclic prefix is used to send the time of day to IoT device.

In another aspect, the time of day is sent to IoT devices through "M" consecutive first samples of transmit cyclic prefix of "M" consecutive symbols.

In another aspect, any sample of the downlink transmit cyclic prefix of 4G, 5G, and WiFi can be used to transmit the time of day to IoT device.

In one aspect, in order to avoid any problem with cyclic prefix removal in IoT device receiver only one sample of downlink transmit cyclic prefix in 4G, 5G, and WiFi is used to transmit the time of day.

In another aspect, if the removal of cyclic prefix in IoT device receiver is not disturbed more than one sample of downlink transmit cyclic prefix is used to send the time of day.

In one aspect, the time of day is send continuously using downlink transmit cyclic prefix.

In another aspect, the time of day is sent once every "N" downlink transmit symbols with N>>M.

In one aspect, the transmission of the time of day using cyclic prefix of a 4G, 5G, and WiFi downlink transmit symbol is performed with various implementation to avoid any problem in removal of cyclic prefix in the IoT device receiver.

In another aspect, the IoT (IoE) network is $5^{th}$ generation (5G) fix and mobile data communication network.

In one aspect, IoT network is any fix and mobile data communication network beyond 5G such as $6^{th}$ generation (6G), $7^{th}$ generation (7G) and etc.

In another aspect, IoT network is a proprietary network.
In one aspect, IoT network is WiFi (wireless fidelity) network.

In another aspect, IoT is part of a satellite network supporting one of data communication standards like 5G, 6G, 7G or a proprietary data communication standard.

In one aspect, an IoT device within IoT network uses a sensor/monitoring device for certain data collection application.

In another aspect, certain data collecting applications use multiple of sensors/monitoring devices but only one of them is a master and acts as IoT device that communicates with IoT network. All sensors/monitoring devices used in the data collecting application communicate among themselves using wired and/or wireless link.

In another aspect, in cases that a data collecting application uses multiple sensors/monitoring devices each individual sensor/monitoring device used within the data collecting application has an IP (internet protocol) address and uses a proprietary or any standard protocol (such as IP protocol) to communicate with other sensors used in the data collecting application similar to an IP communication network.

In one aspect, the IoT network uses the time of day to program the IoT device an absolute time for data collection.

In another aspect, the IoT network uses the time of day to program the IoT devices an active time to collect data and a sleep time or idle time to save power.

In one aspect, the IoT network uses the time of day to program the IoT device an absolute time to transmit collected data to the IoT network.

In one aspect, the absolute time is defined by the hour, the minute, the second, the millisecond, the microsecond, the nanosecond and the picoseconds.

In another aspect, the absolute time includes the hour.

In one aspect, the absolute time includes the hour and the minutes.

In one aspect, the absolute time includes the hour, the minutes, and the seconds.

In one aspect, the absolute time includes the hour, the minutes, the seconds, and the milliseconds.

In one aspect, the absolute time includes the hour, the minutes, the seconds, the milliseconds, and the microseconds.

In one aspect, the absolute time includes the hour, the minutes, the seconds, the milliseconds, the microseconds, and the nanoseconds.

In another aspect, the absolute time is only defined by minutes, by seconds, by milliseconds, by microseconds, by nanoseconds, or by picoseconds.

In another aspect, the absolute time hour is 0 to 24, minute is 0 to 60, second is 0 to 60, millisecond is 0 to 1000, microsecond in 0 to 1000, and nanosecond is 0 to 1000.

In one aspect, the absolute time is only defined by hour (0 to 24), by minutes (0 to 1440), by seconds (0 to 86400), by milliseconds (0 to 86400000) and so on.

In one aspect, the IoT network defines the date and time of day for data collection.

In another aspect, the date is defined by the year, month, and day.

In one aspect, the IoT network specifies the date and absolute time an IoT device sends the collected data to the IoT network for processing.

In another aspect, the IoT network demands the IoT device to send the data real time to IoT network.

In one aspect, an IoT device comprises of a sensor/monitoring device and a wireless transceiver to communicate with IoT network as well as other IoT devices.

In another aspect, an IoT device is only a wireless transceiver that communicates with IoT network and obtains its data from one or more data collecting sensors that are externally attached to it.

In another aspect, a master IoT device collects data from other IoT devices and communicates them to the IoT network.

In one aspect, the master IoT devices or IoT devices broadcast certain information data to other master IoT devices or IoT devices that are linked or belong to a specific smart environment.

In another aspect, the broadcast information data within IoT devices is used for specified application.

In another aspect, the broadcast information data within IoT devices is used for any application.

In one aspect, the broadcast information data sent by IoT devices depends on the sensors/monitoring device used in the application.

In another aspect, the broadcast data is defined by IoT network.

In one aspect, the broadcast data is transmitted and received by an IoT device at an absolute time defined by IoT network.

In another aspect, the IoT device obtains the time of day at start up.

In one aspect, the IoT device is a flying object, a moving object, and a stationary object.

In one aspect, when the IoT device is a flying object it obtains the time of day when it is flying, flying with low speed or it is stationary.

In one aspect, when the IoT device is a moving object it obtains the time of day when it is moving, moving with low speed or it is stationary.

In another aspect, IoT devices in a smart environment communicate directly and the start and end time of communication is defined by the IoT network.

In one aspect, IoT devices are identified by their IP addresses when communicating among themselves in a smart environment.

In another aspect, the IoT devices use Ethernet packet protocol to communicate among themselves.

In one aspect, the IoT devices use a proprietary packet protocol to communicate among themselves.

In one aspect, the IoT devices use a WiFi protocol to communicate among themselves.

In another aspect, IoT devices support at least one of a BLUETOOTH transceiver, a ZIGBEE transceiver, and a WiFI transceiver.

In one aspect, the IoT devices use a 5G, 6G, 7G protocols to communicate among themselves.

In another aspect, the IoT device is a biometric device.

In one aspect, an IoT device is any object used in a factory.

In another aspect, an IoT device is any object used in a house.

In one aspect, an IoT device is any object used in a hospital.

In another aspect, an IoT device is any wearable device.

In one aspect, an IoT device is any object on a road, street, or highway inside and outside a city.

In another aspect, an IoT device is in general any equipment, object, tool, and device in an environment.

In one aspect, the IoT device has at least one sensor/monitoring device to collect data.

In another aspect, the IoT device does not have a sensor/monitoring device and consist of a transceiver.

In one aspect, the type of IoT device is identified by its IP address.

In another aspect, the type of IoT device is identified by its type indicator.

In another aspect, the type of IoT device is identified by its serial number.

In one aspect, IoT device sends a time stamp with its broadcast data that shows the time of day broadcast data was transmitted at the antenna port of the transmitter of the IoT device's transceiver.

In another aspect, the IoT device's transceiver at the detector of its receiver detects the time of day the broadcast data was transmitted at the antenna port of another IoT device's transceiver and calculates the time of day the broadcast data received at its own transceiver antenna port.

In another aspect, an IoT device uses GPS (Global Positioning System) receiver to obtain location and time of day.

In one aspect, an IoT device uses its wireless transceiver to broadcast its type, IP address, location, mass, the time of day, and propagation time through its transceiver's transmitter up to antenna port.

In one aspect, the time of day that is broadcasted by an IoT device is in form of a time stamp which can be used to calculate distance.

In another aspect, the stationary object is a lamp post, a building, a tree, a stationary vehicle/object, a traffic light post, a statue, and any other stationary object in an environment.

In one aspect, an IoT device changes its carrier frequency and modulation for better, faster transmission and reception of information.

In another aspect, an IoT device obtains information about its surrounding environment such as location, mass, and type of an object with potential impact.

BRIEF DESCRIPTION OF THE DRAWINGS

FIG. 9A through 9C depicts an OFDM transmit signal with cyclic prefix and coverage FIG. 10 shows an Ethernet frame and a broadcast signal frame FIG. 14A through 14D illustrate embodiments of transmit signal for wireless sensor.

FIG. 21 depicts an embodiment of an expandable pad

DESCRIPTION OF EMBODIMENTS

Reference will now be made in detail to embodiments of the present technology, examples of which are illustrated in the accompanying drawings.

While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
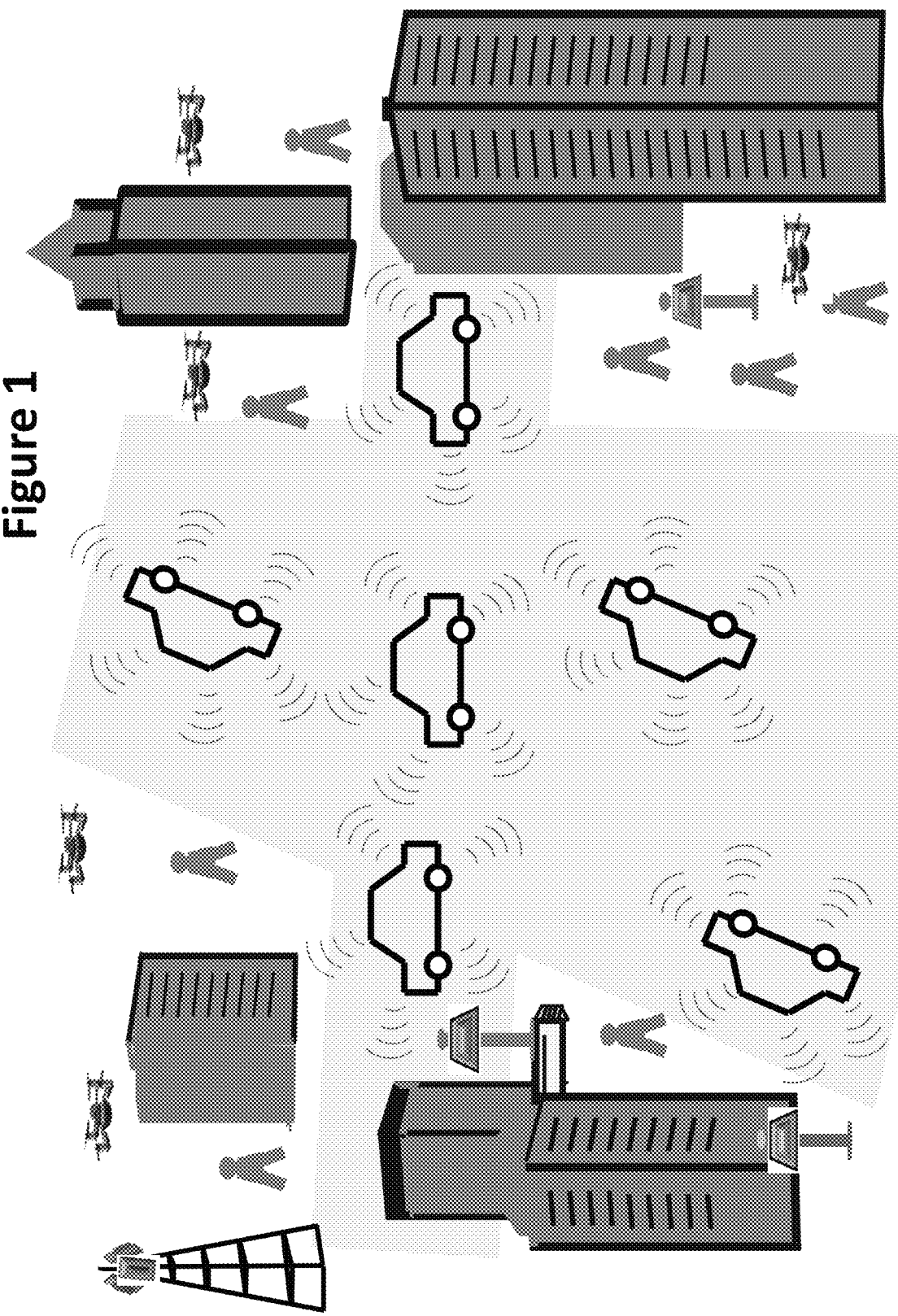
FIG. 1 illustrate a typical surrounding environment scenario for moving, flying vehicles/objects and stationary objects as IoT devices

FIG. 1 illustrates a typical environment with moving and stationary objects. The stationary objects are trees, lamp posts, small cells, buildings, street floors, walking payments, parked vehicles, statues, houses, hospitals, gas stations, schools, sport fields, shopping malls, small shops, department stores, parking lots, and any other stationary objects. Stationary objects are identified by their types, an IP addresses, shapes, masses, and locations. Stationary objects act as an IoT device or IoT devices with a single IP address or independent IP addresses. Large building at different sides requires different IoT devices representing different locations and sides.

The moving vehicles are robots, humans with body armor, humans, animals, automobiles, trucks, boats, ships, bicycles, motorcycles, moving objects in a factory, moving objects in a hospital, moving objects used in buildings, and any other moving objects.

The flying vehicles are helicopters, small planes, large planes, flying humans, flying robots, gliders, flying cars, drones, missiles, birds, and any other flying objects.

Figure 2:
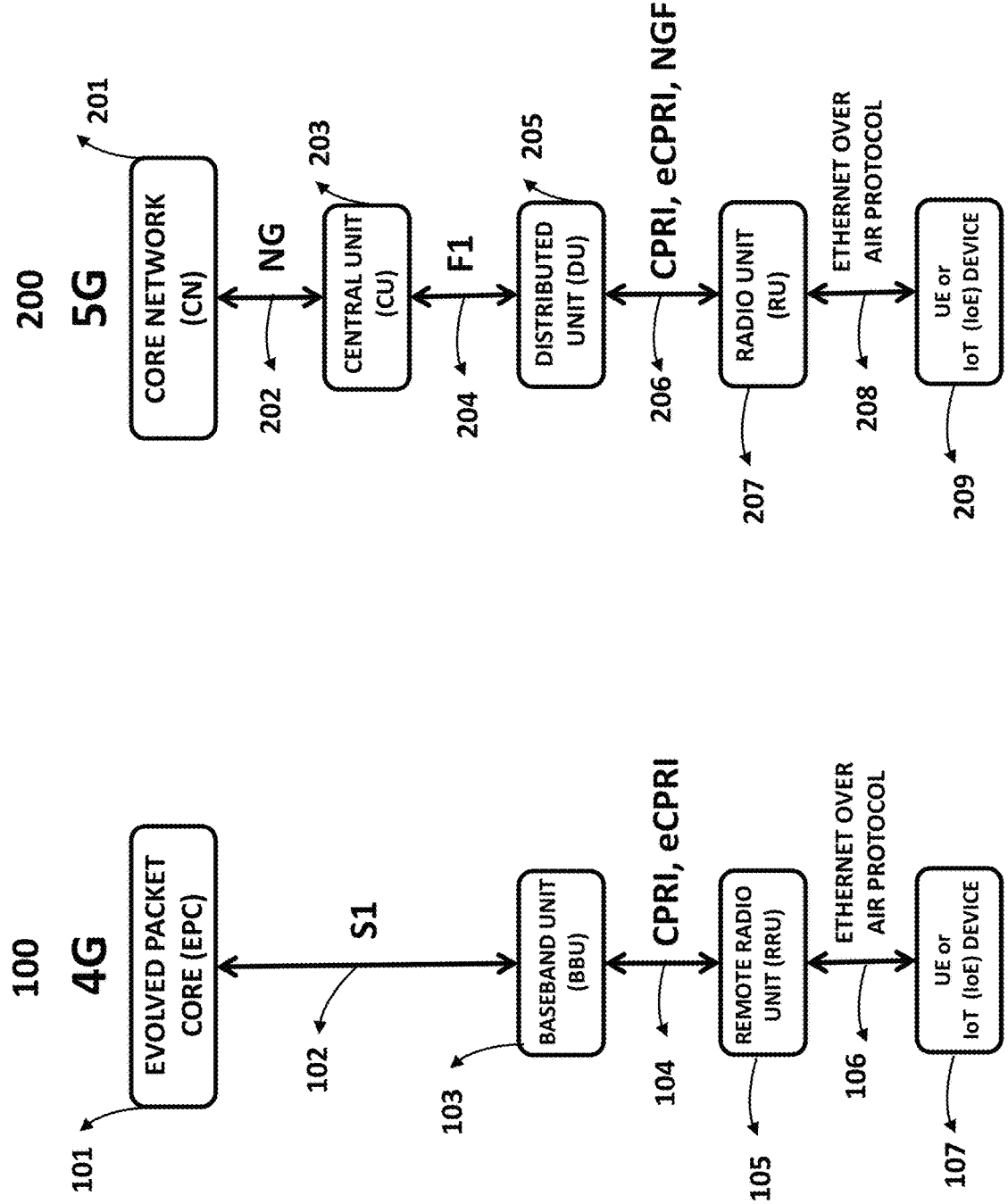
FIG. 2A illustrates 4G IoT (IoE) Network FIG. 2 B illustrates 5G IoT (IoE) Network

FIGS. 2A and 2B depict 4G and 5G end to end IoT networks 100 and 200. 4G network 100 facilitate communication between user equipment (UE) 107 and evolved packet core (EPC) 101 through remote radio unit (RRU) 105 and baseband unit (BBU) 103 using over the air protocol interface 106, evolved common public radio interface (eCPRI) 104 and "S1" interface 102. 5G network 200 facilitate communication between user equipment (UE) 209 and core network (CN) 201 through radio unit (RU) 207, distributed unit (DU) 205, and central unit (CU) 203 using over the air protocol interface 208, evolved common public radio interface (eCPRI) or next generation fronthaul interface (NGFI) 206, F1 interface 204 and "NG" interface 202. Both UEs 107 and 109 also act as IoT (IoE) device.

The 4G network 100 uses different architectures depending on applications. In small cells BBU 103 and RRU 105 are collocated and there is no need for CPRI or eCPRI interface 104. A small cell connects to evolved packet core 101 through "S1" interface 102 which uses Ethernet protocol. CPRI is a synchronous protocol which is used between RRU 105 and BBU 103. eCPRI uses Ethernet to encapsulate CPRI and is an asynchronous interface protocol between RRU 105 and BBU 103. "S1" interface between BBU 103 and EPC 101 uses Ethernet protocol. 5G network 200 also uses different architectures depending on applications that the network is used for. In certain architectures one or more network components are collocated. When one or more network components are collocated the components use the interfaces defined in the standard. However, there are cases such as a small cell when two or more components of network are co-located and the interfaces may be eliminated.

When Ethernet protocol is used between two ports there is a need for synchronization. There are a number of synchronization techniques that are used in data communication networks and the most common one depending on requirements of network components or ports are syncE, PTP or IEEE1588, NTP, and GPS. The Network Time Protocol (NTP) is a networking protocol for clock synchronization between computer systems over packet-switched, variable-latency data networks. In operation since before 1985, NTP is one of the oldest Internet protocols in current use. Synchronous Ethernet, also referred to as SyncE, is an ITU-T standard for computer networking that facilitates the transference of clock signals over the Ethernet physical layer. This signal can then be made traceable to an external clock. IEEE 1588 Precision Time Protocol (PTP) is a packet-based two-way communications protocol specifically designed to precisely synchronize distributed clocks to sub-microsecond resolution, typically on an Ethernet or IP-based network. Global Satellite Positioning System (GPS) signal is received, processed by a local master clock, time server, or primary reference, and passed on to "slaves" and other devices, systems, or networks so their "local clocks" are likewise synchronized to coordinated universal time (UTC).

In both 4G network 100 and 5G network 200 when the link between two network ports is Ethernet then there is a need to synchronize the two network components using SyncE, IEEE1588 (PTP) or NTP depending on requirements and specification of two network components. "S1" interface in 4G networks, "F1" interface and "NG" interface in 5G networks use Ethernet packet protocol and IEEE1588 is widely used for synchronization between two network ports.

In case of RU 107 and RRU 105 when CPRI is used as the interface protocol clock synchronization is possible because CPRI is a synchronous protocol. When eCPRI which is an asynchronous protocol is used as RU and RRU interface to DU and BBU there is a need for one of the above mentioned synchronization techniques. If only clock synchronization is needed then syncE protocol is sufficient. However, when time of day is a requirement then IEEE1588 (PTP) or GPS needs to be used.

Mobile user equipment (UE) 107 and 109 use GPS to obtain the time of day/location and over the air protocol to achieve frequency and phase synchronization. However, for UEs or IoT devices that either can't see the GPS satellites, GPS signal is very weak, or GPS receiver increases cost, size, and power consumption another technique to acquire time of day is require. UEs and IoT devices can use their received 4G and 5G signal to achieve frequency and phase synchronization. UEs and IoT devices that do not have access to GPS signal can either obtain time of day from UEs and IoT devices in surrounding environment that have access to GPS signal and are accessible or obtain it from RUs and RRUs that they communicate with.

There are three techniques that UEs and IoT devices can use to obtain time of day from RUs and RRUs. The precision of the time of day will be different using these three techniques. The time of day with different accuracies are used for different applications. The less accurate time of day uses one way communication between RU 207, RRU 105 and UEs or IoT devices 209, and 107 and the more accurate time of day uses two way communications between RU 207, RRU 105 and UEs or IoT devices 209, and 107. In both methods RU 207 and RRU 105 should have the time of day. In 4G network 100 and 5G network 200 for architectures that RU 207 and RRU 105 do not have the time of day or can't support exchange of time of day with UEs and IoT devices then the network component prior to RU and RRU which are DU 205 and BBU 103 can be used to propagate the time of day to UEs and IoT devices 209, and 107. The same applies to DU 205 and BBU 103. When DU and BBU do not have the time of day then CU 203 and EPC 101 can be used to propagate the time of day to UEs or IoT devices 209, and 107.

In one embodiment, 4G network 100 and 5G network 200 provide the time of day to UEs and IoT devices, using institute of electrical and electronic engineering (IEEE1588) precision time protocol (PTP). IEEE1588 PTP exchange the timing messages to and from UEs or IoT devices and one component of 4G network 100 and 5G network 200.

In one embodiment, IEEE1588 PTP messages are exchanged between UEs or IoT devices and one of RRU 105, BBU 103, or EPC 101.

In another embodiment, IEEE1588 PTP messages are exchanged between UEs or IoT devices and one of RU 207, DU 205, or CU 203.

In one embodiment of 4G network 100, the time of day is sent to UEs and IoT devices by cyclic prefix of OFDM (orthogonal frequency division multiplexing) symbols from at least one of RRU 105, or BBU 103 depending which network component performs IFFT (inverse fast Fourier Transform).

In another embodiment of 5G network 200, the time of day is sent to UEs and IoT devices by cyclic prefix of OFDM symbols from at least one of RU 207, or DU 205 based on which network component performs IFFT (inverse fast Fourier Transform).

In one embodiment, 4G and 5G networks 100 and 200 utilize unused downlink sub-carriers to send the time of day to UEs or IoT devices 209, and 107.

In another embodiment, 4G and 5G networks 100 and 200 utilize unused bits or messages in various downlink channels to send the time of day to UEs or IoT devices 209, and 107.

In one embodiment, 5G, 6G, and 7G networks transmit Ethernet packets over the air to UEs or IoT devices in order to have an end-to-end network using a single packet protocol. By doing this both hardware and software is significantly simplified.

In another embodiment, UEs and IoT devices obtain time of day from other UEs or IoT device in surrounding environment that are in their communication range and have time of day.

In one embodiment, UEs and IoTs devices use another frequency to communicate with other UEs and IoT devices in surrounding environment and exchange broadcast data.

In another embodiment, UEs and IoT devices communicate with other UEs and IoT devices by exchanging Ethernet packets or any other proprietary packets.

In one embodiment, UEs and IoT devices use similar physical layer as 4G or 5G to communicate with other UEs and IoT devices in their surrounding environment without introducing any unwanted interference.

In another embodiment, UEs and IoT devices use a physical layer different from 4G or 5G to communicate with other UEs and IoT devices in their surrounding environment without introducing any unwanted interference.

In one embodiment, UEs and IoT devices communicate with WiFi network or any other proprietary network to obtain time of day and other information in their surrounding environment.

In another embodiment, a specific time is defined and communicated to UEs and IoT devices by 4G and 5G networks for broadcasting or communication with other UEs or IoT devices in order to avoid interruption and interference.

In one embodiment, UEs and IoT devices support Bluetooth, Zigbee, infrared, GPS, WiFi, and any other wireless communication systems to communicate with other UEs and IoT devices in their surrounding environment and exchange information data and transmit and receive broadcast data.

In another embodiment, UEs and IoT devices transmit and receive broadcast data that includes the type of UE and IoT device, their IP address, their location, their mass, time of day, method of obtaining the time of day (IEEE1588, cyclic prefix, GPS, or other methods) and propagation time through its transceiver's transmitter up to antenna port.

In one embodiment, UEs or IoT devices broadcast the time of day at their transmitter antenna port to other UEs or IoT devices in their surrounding environment.

In one embodiment, UEs and IoT devices support WiFi, Bluetooth, Zigbee over the air wireless protocols.

Figure 3:
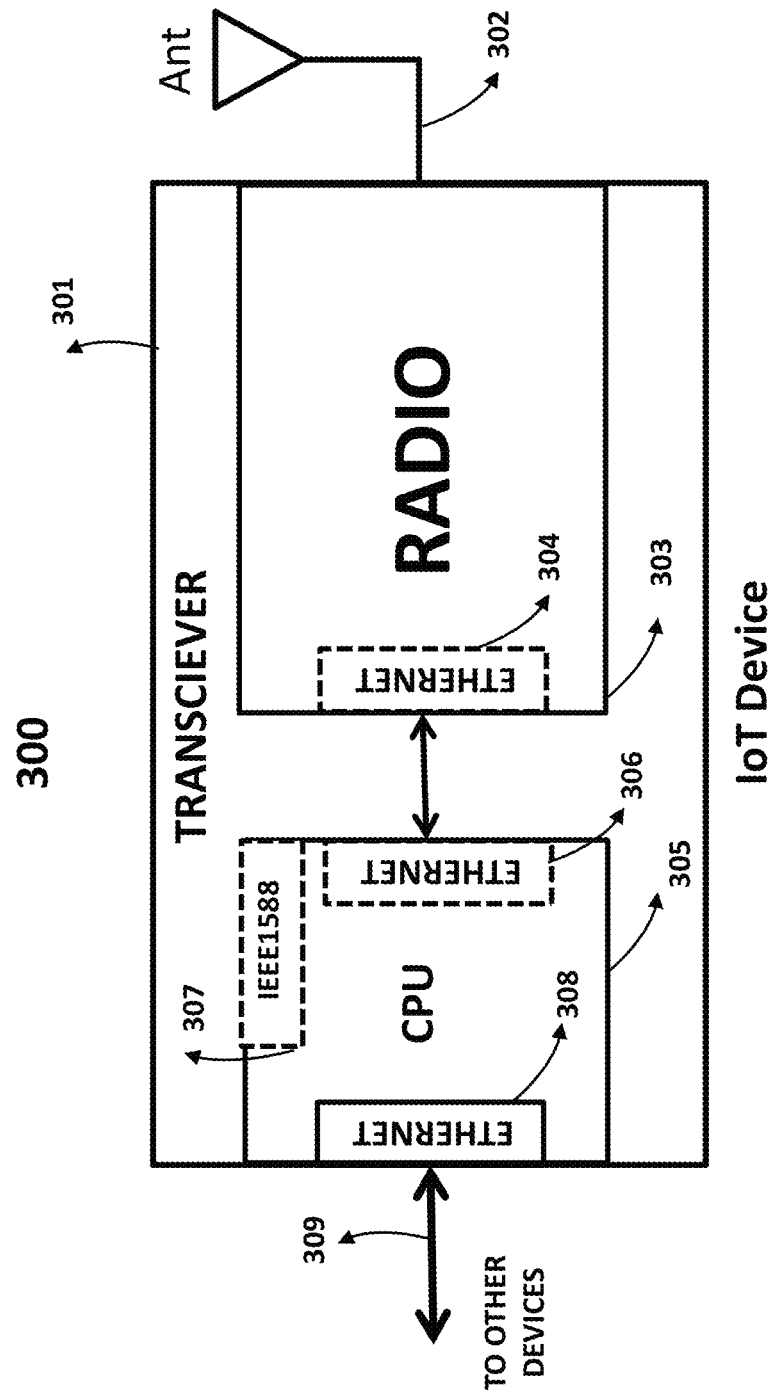
FIG. 3 illustrates a typical IoT device that can be found in an environment communicating with cellular network

FIG. 3 illustrate the architecture of an IoT device 300. In general IoT device 300 communicates with 4G and 5G networks to exchange information data. IoT device 300 through radio 303 attaches itself to a 4G or 5G network in its surrounding environment and listens to commands to perform certain functions. Radio 303 when receives a command sends it to CPU 305 to be evaluated and performed by CPU 305 or uses other devices that are connected to CPU 305 to perform the command or commands. Then the results obtained from performing the commands through CPU 305 and radio 303 is transmitted to 4G or 5G network for analysis.

In one embodiment, IoT device 300 includes among other things transceiver 301 which consists of antenna 302, radio 303, possible radio Ethernet port 304, CPU 305, possible Ethernet port 306 towards radio, possible IEEE1588 PTP 307, and Ethernet port 308 towards other devices.

In one embodiment, IoT device 300 through antenna 302 and radio 303 attaches to 4G or 5G IoT network and if needed obtains the time of day.

In another embodiment, IoT device transceiver 301 obtains the time of day through IEEE1588 PTP, downlink transmit cyclic prefix, downlink transmit unused sub-carriers, or unused bits or messages in one of downlink channels from 4G or 5G IoT network.

In one embodiment, IoT device 300 communicates via its transceiver's CPU 305 with another device using an Ethernet port 308.

In another embodiment, IoT device 300 propagates the time of day to an external device or equipment via its transceiver's Ethernet port 308 and link 309 using IEEE1588 PTP 307.

In one embodiment, IoT device 300 receives commands or information data from 4G or 5G IoT network and communicates the commands to an external device through its transceiver's Ethernet port 308.

In one embodiment, IoT device 300 receives information data from an external device through its Ethernet port 308 and transmits it to 4G or 5G IoT network using its transceiver's radio 303 and antenna 302.

In another embodiment, IoT device 300 communicates to an external device via its transceiver's CPU 305 using a serial interfaces or a parallel interface instead of Ethernet interface 308.

In one embodiment, IoT device 300 communicates with other IoT devices and exchange broadcast data. The IoT device 300 uses a different frequency or channel to communicate with another IoT device in order to avoid interruption and interference.

In another embodiment, IoT device 300 communicates with other IoT devices in its surrounding environment that are in its communication range using a proprietary physical layer or a physical layer similar to 4G or 5G network.

In one embodiment, IoT device 300 exchanges Ethernet packets or any other proprietary packets with other IoT devices in its surrounding environment.

In another embodiment, IoT device 300 communicates with a WiFi network in its surrounding environment.

In one embodiment, IoT device 300 through its transceiver 301 supports WiFi, Bluetooth, Zigbee over the air wireless protocols.

In one embodiment, IoT device exchange IEEE1588 PTP messages with another IoT device or a WiFi router in surrounding environment to obtain or propagate the time of day.

In another embodiment of IoT device 300, the device that is connected to transceiver 301 through link 309 is any device or object that is remotely controlled to perform certain function.

Figure 4:
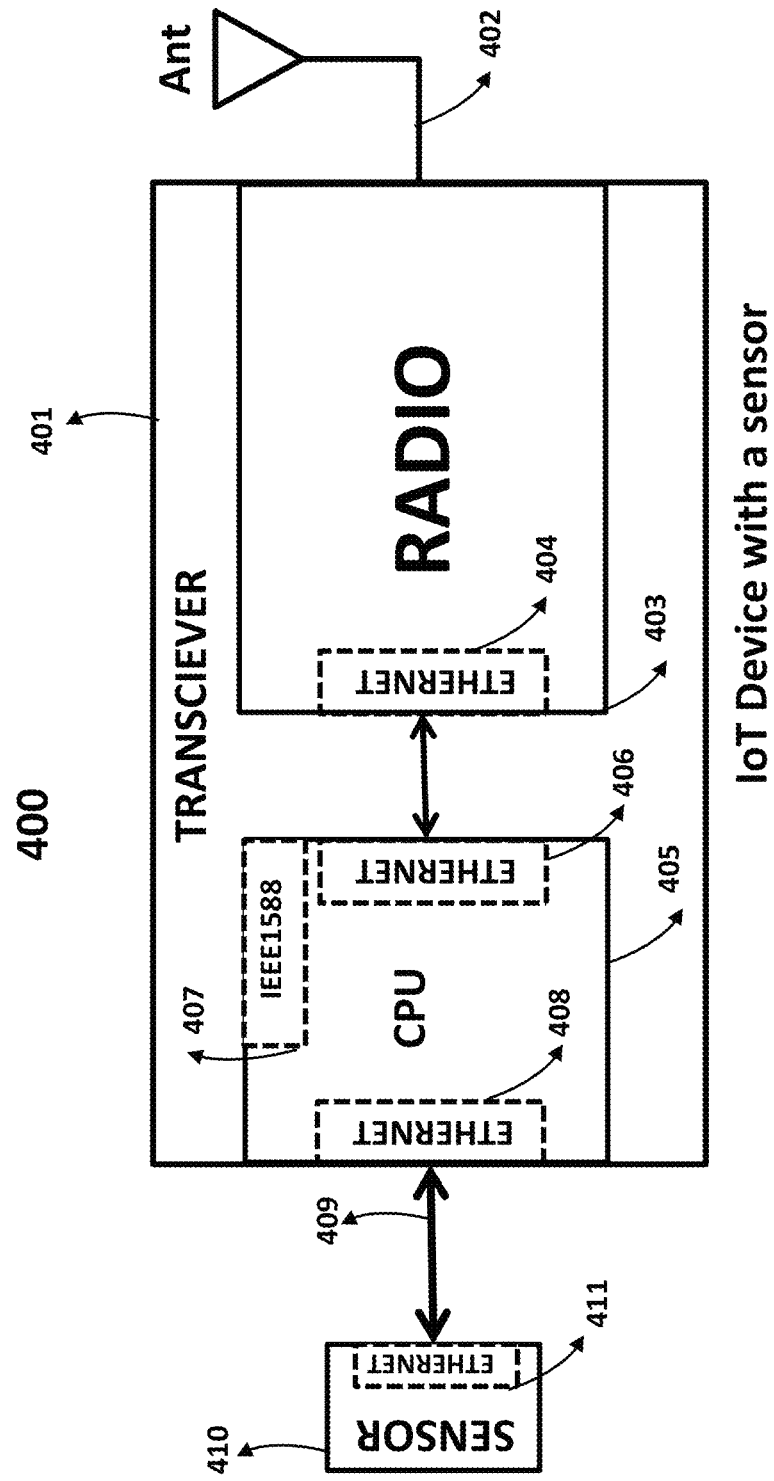
FIG. 4 illustrates a typical IoT device that can be found in an environment communicating with cellular network with a single sensor

FIG. 4 shows the architecture of an IoT sensor device 400. In general IoT sensor device 400 communicates with 4G and 5G networks to exchange information data. IoT sensor device 400 through radio 403 attaches itself to a 4G or 5G network in its surrounding environment and listens to commands to activate sensor 410. Radio 403 when receives a command, sends it to CPU 405 to be evaluated and performed by CPU 405 or sensor 410 that is connected to CPU 405. Then the results obtained from performing the commands through CPU 405 and radio 403 is transmitted to 4G or 5G network for analysis.

In one embodiment, IoT sensor device 400 includes, among other things transceiver 401 which consists of antenna 402, radio 403, possible radio Ethernet port 404, CPU 405, possible Ethernet port 406 towards radio, possible IEEE1588 PTP 407, possible Ethernet port 408 and sensor 410 with possible Ethernet port 411.

In one embodiment, IoT sensor device 400 uses an attached sensor 410.

In another embodiment, IoT sensor device 400 uses an external device which is a sensor 410.

In one embodiment, IoT sensor device 400 uses an external sensor 410 that communicates with transceiver 401 using Ethernet packet protocol through Ethernet ports 411 and 408.

In another embodiment, the link 409 between Ethernet port 408 of transceiver 401 and Ethernet port 410 of sensor 411 is a wired link or a wireless link.

In another embodiment of IoT sensor device 400, the wired 409 link is a standard serial interface, a proprietary serial interface, or a parallel interface.

In one embodiment of IoT sensor device 400, the wireless link 409 between transceiver 401 and sensor 411 is at least one of Bluetooth, Zigbee, WiFi, or any proprietary wireless link.

In another embodiment of IoT sensor device 400, the sensor 411 does not necessarily sense anything. Sensor 411 is a tool, equipment, a robot hand, an on/off switch, any activation or deactivation device, and any device, equipment or object that is remotely controlled to perform certain function.

Figure 5:
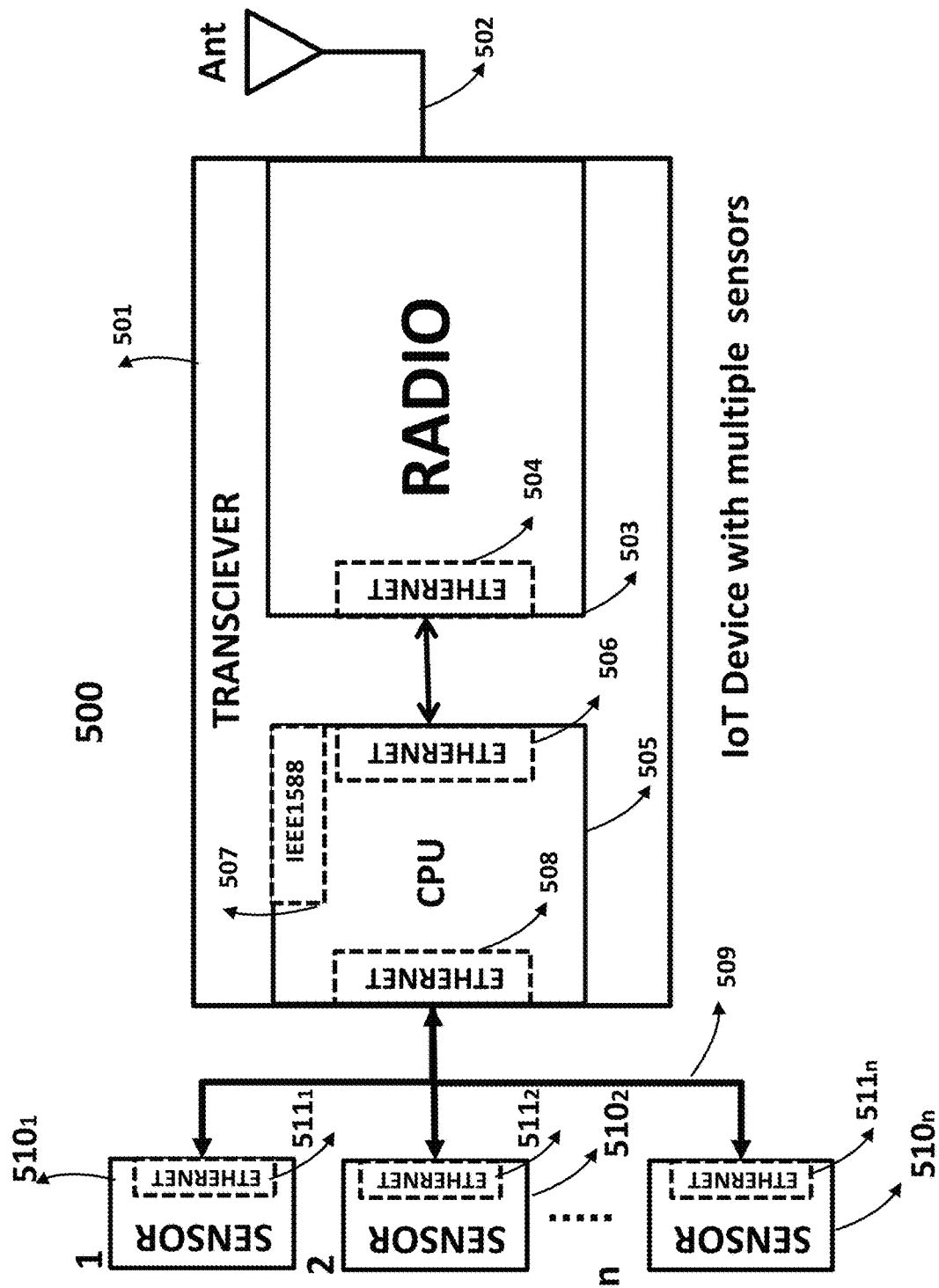
FIG. 5 depicts a typical IoT device that can be found in an environment communicating with cellular network with multiple sensors

FIG. 5 shows the architecture of an IoT sensor network 500. In general IoT sensor network 500 communicates with 4G and 5G networks to exchange information data. IoT sensor network 500 through radio 503 attaches itself to a 4G or 5G network in its surrounding environment that supports Internet of Things and listens to commands to activate sensor network $510_1$ to $510_n$. Radio 503 when receives a command, sends it to CPU 505 to be evaluated and performed by CPU 505 or sensor network $510_1$ to $510_n$ that is connected to CPU 505. Then the results obtained from performing the commands through CPU 505 and radio 503 is transmitted to 4G or 5G network for analysis.

In one embodiment, IoT sensor network 500 includes among other things transceiver 501 which consists of antenna 502, radio 503, possible radio Ethernet port 504, CPU 505, possible Ethernet port 506 towards radio, possible IEEE1588 PTP 507, possible Ethernet port 508 and sensor network $510_1$ to $510_n$.

In another embodiment, IoT sensor network 500 uses an external monitoring sensor network $510_1$ to $510_n$ that can perform various functions autonomously or through commands that sent to it remotely.

In one embodiment, IoT sensor network 500 uses an external sensor network $510_1$ to $510_n$ that communicates with transceiver 501 through Ethernet ports $511_1$ to $511_n$.

In another embodiment, the sensor network $510_1$ to $510_n$ can be a monitoring network $510_1$ to $510_n$ or a mix of sensors, monitoring devices, autonomous devices, and remotely controlled devices or equipments $510_1$ to $510_n$.

In one embodiment, each device within network of devices $510_1$ to $510_n$ has an IP (internet protocol) address that identifies the device.

In another embodiment, each device within network of devices $510_1$ to $510_n$ uses its serial number for its identity.

In one embodiment of IoT sensor network 500, at least one of an Ethernet packet and a proprietary packet is used for communication between transceiver 501 and devices/equipment $510_1$ to $510_n$.

In another embodiment, the link 509 between Ethernet port 508 or port 508 of transceiver 501 and Ethernet ports $511_1$ to $511_n$ or ports $511_1$ to $511_n$ of devices $510_1$ to $510_n$ is a wired link, a wireless link or a mix of wired and wireless.

In another embodiment of IoT sensor network 500, the wired link 509 is a standard serial interface, a proprietary serial interface, or a parallel interface.

In one embodiment of IoT sensor network 500, the wireless link 509 between transceiver 501 and devices $510_1$ to $510_n$ is at least one of Bluetooth, Zigbee, WiFi, or any proprietary wireless link.

In one embodiment, IoT sensor network 500 receives an absolute time from 4G, 5G, or WiFi network for its various activities as well as scheduling activities of the external devices connected to IoT sensor network 500.

Figure 6:
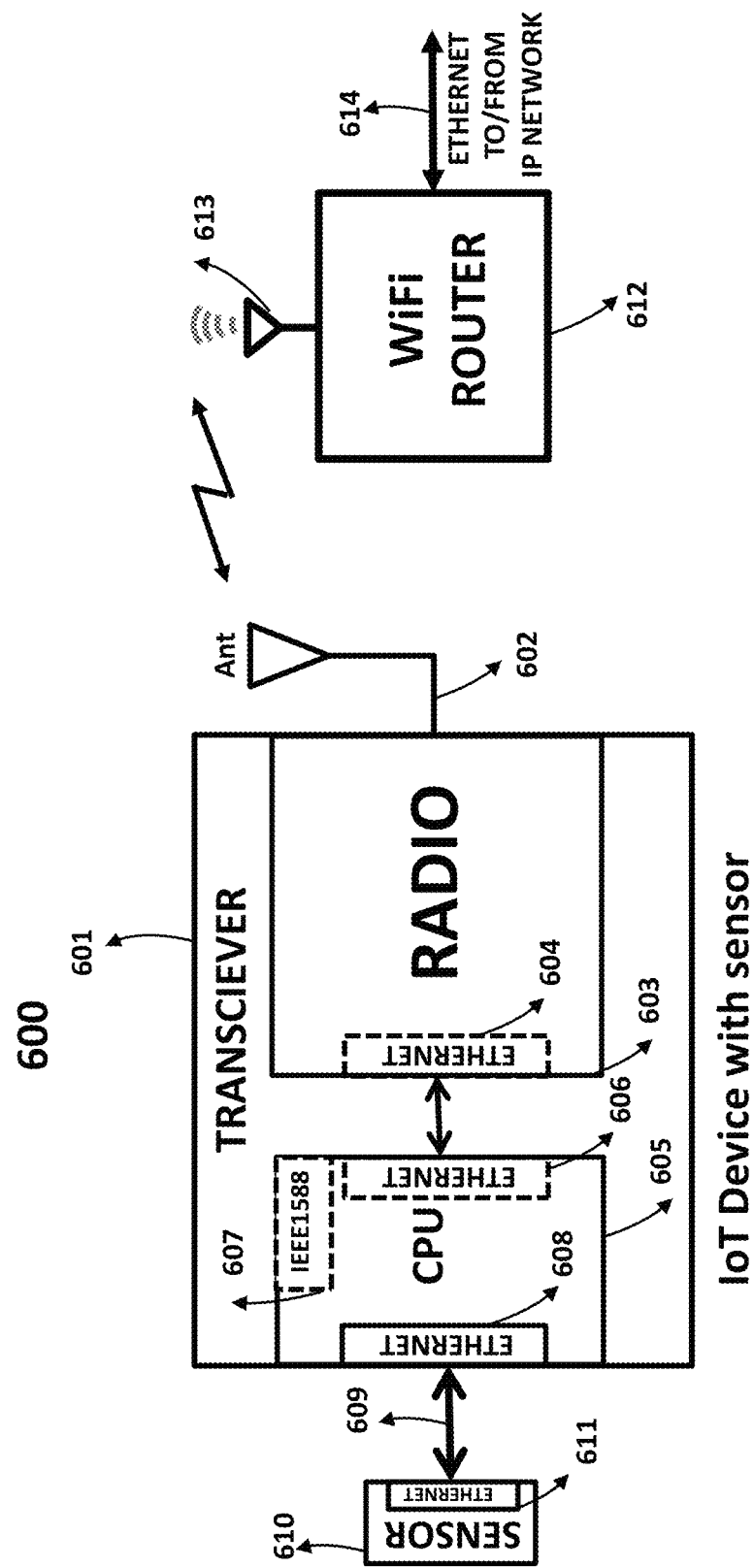
FIG. 6 illustrates a typical IoT device communicating with WiFi network

FIG. 6 illustrate a WiFi based IoT device 600. In general IoT device 600 communicates with WiFi (wireless fidelity) router 612 to exchange information data. IoT device 600 through radio 603 attaches itself to a WiFi router 612 in its surrounding environment that supports Internet of Things and listens to commands to activate sensor 610. Radio 603 when receives a command sends it to CPU 605 to be evaluated and performed by CPU 605 or sensor 610 (or any other device instead of sensor 610) that is connected to CPU 605. Then the results obtained from performing the commands through CPU 605 and radio 603 is transmitted to WiFi network for analysis.

In one embodiment, IoT device 600 uses IEEE1588 PTP to obtain time of day from WiFi router.

In another embodiment, IoT device 600 uses downlink transmit OFDM cyclic prefix, downlink transmit OFDM unused sub-carriers, or unused bits or messages in a downlink WiFi frame to obtain time of day.

In one embodiment, IoT device 600 receives an absolute time from WiFi router for its various activities as well as scheduling the external devices connected to IoT device 600 for their activities.

Figure 7:
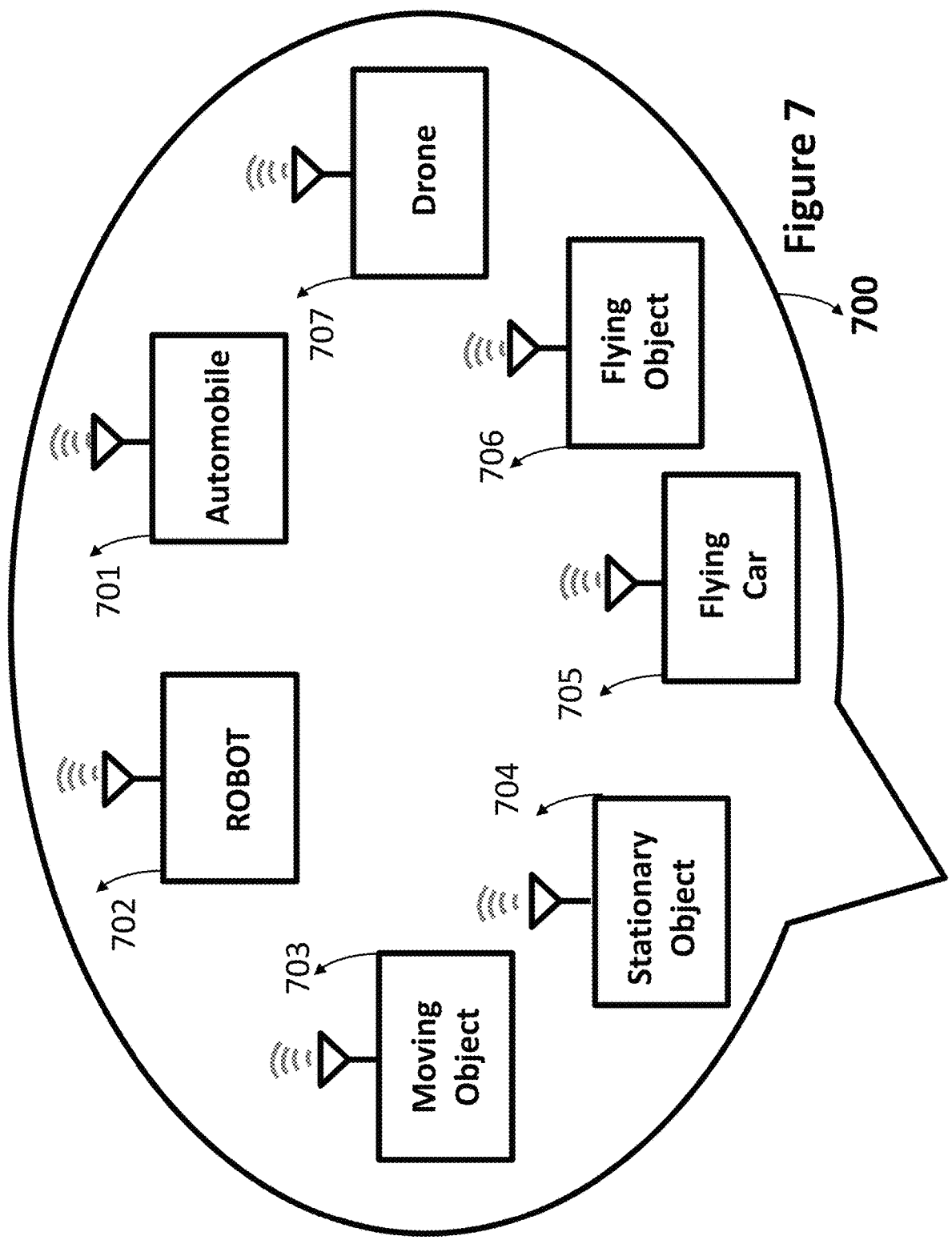
FIG. 7 shows moving vehicles, flying vehicles/objects, and stationary objects that act as an IoT in an environment

FIG. 7 depicts a smart environment 700. In general in the smart environment 700 in addition to open space various stationary, moving and flying object exist. In the smart environment or area 700 all the objects coexist and operate synchronously and freely without any interruption, interference, and collision.

Smart environment 700 includes, among other things, automobile 701, robots 702, moving objects 703, stationary objects 704, flying car 705, flying object 706, and drone 707.

In one embodiment, moving object 703 is human with body amour, bicycle, motorbike, boat and etc.

In one embodiment, stationary object 704 is a tree, a lamp post, a small cell, a building, a statue and etc.

In another embodiment of smart environment 700, flying object 706 is a helicopter, a small plane, a flying human, a flying robot, a glider, and etc.

In one embodiment of smart environment 700, automobile 701, robot 702, moving object 703, stationary object 704, flying car 705, flying object 706, and done 707 act as IoT devices and broadcast wirelessly certain data specific to automobile, robot, moving object, stationary object, flying car, flying object, and drone.

In another embodiment of smart environment 700, the broadcast data includes a time stamp indicating time of day, method of obtaining the time of day (IEEE1588, cyclic prefix, GPS, or others), type of the object, location coordinates obtained from GPS (global positioning system) receiver, an identity number, signal propagation time through transmitter of the IoT device's transceiver up to the input of transmit antenna, and an estimated mass.

In one embodiment, the identity number of an object (IoT device) is its serial number.

In one embodiment, the identity number of an object (IoT device) is an IP (Internet Protocol) address.

In another embodiment of smart environment 700, each object (IoT device) in the environment receives the broadcast data from other objects (IoT devices) and is fully aware of its surrounding environment.

In one embodiment of smart environment 700, each object (IoT device) in the environment uses a protocol that is known to all objects (IoT devices) for broadcasting its data.

In one embodiment of smart environment 700, the broadcast protocol is defined by a standard body like IEEE (Institute of electrical and electronic engineering), ITU (International Telecommunication Union), or cellular network (5G and beyond).

In another embodiment, the broadcast protocol includes frames with a synchronization pattern for the receiver of object's (IoT device's) transceiver to synchronize and detect the broadcast data.

In one embodiment, the payload in each broadcast frame which consists of an object's (IoT device's) information data is compressed to reduce time and bandwidth required for transmission of the frame.

In one embodiment, one or more synchronization pattern are stored in the object's (IoT device's) transceiver or obtained from other public or private networks.

In another embodiment, an object (IoT device) in the smart environment 700 uses the time stamp and transmitter propagation time up to transmit antenna received from another object (IoT device) in the smart environment 700, and receiver propagation time of its own transceiver up to its detector (where the time stamp is detected) to estimate free space traveling time of broadcast data carrying the time stamp as well as free space traveling time of the time stamp. Then the free space traveling time of time stamp is used to calculate the distance between the two objects (IoT devices). From two consecutive estimated distances of the two objects (IoT devices) their approaching speed towards each other can be estimated. Further more from change in speed, acceleration or deceleration is obtained which is used to estimate an impact force between two objects (IoT devices) using the mass of the two objects (IoT devices).

In one embodiment, an object (IoT device) in smart environment 700 broadcast a time stamp which indicates the time of day at its transmitter antenna port.

In another embodiment, an object (IoT device) in the smart environment 700 uses the time stamp indicating the time of day at the transmitter antenna port of another object (IoT device) in the smart environment 700, and receiver propagation time of its own transceiver up to its detector (where the time stamp is detected) and the time of day the time stamp (from the other object or IoT device) is detected to estimate free space traveling time of the time stamp between two objects (IoT devices). Then the distance between the two objects (IoT devices) is calculated from free space traveling time of the time stamp.

In another embodiment, an object (IoT device) in the smart environment 700 uses GPS location coordinates of other objects (IoT devices) received from their broadcast data to calculate the distance between itself and other objects (IoT devices).

In one embodiment, a stationary object (IoT device) in the smart environment has its GPS location coordinates manually program to it.

Figure 8:
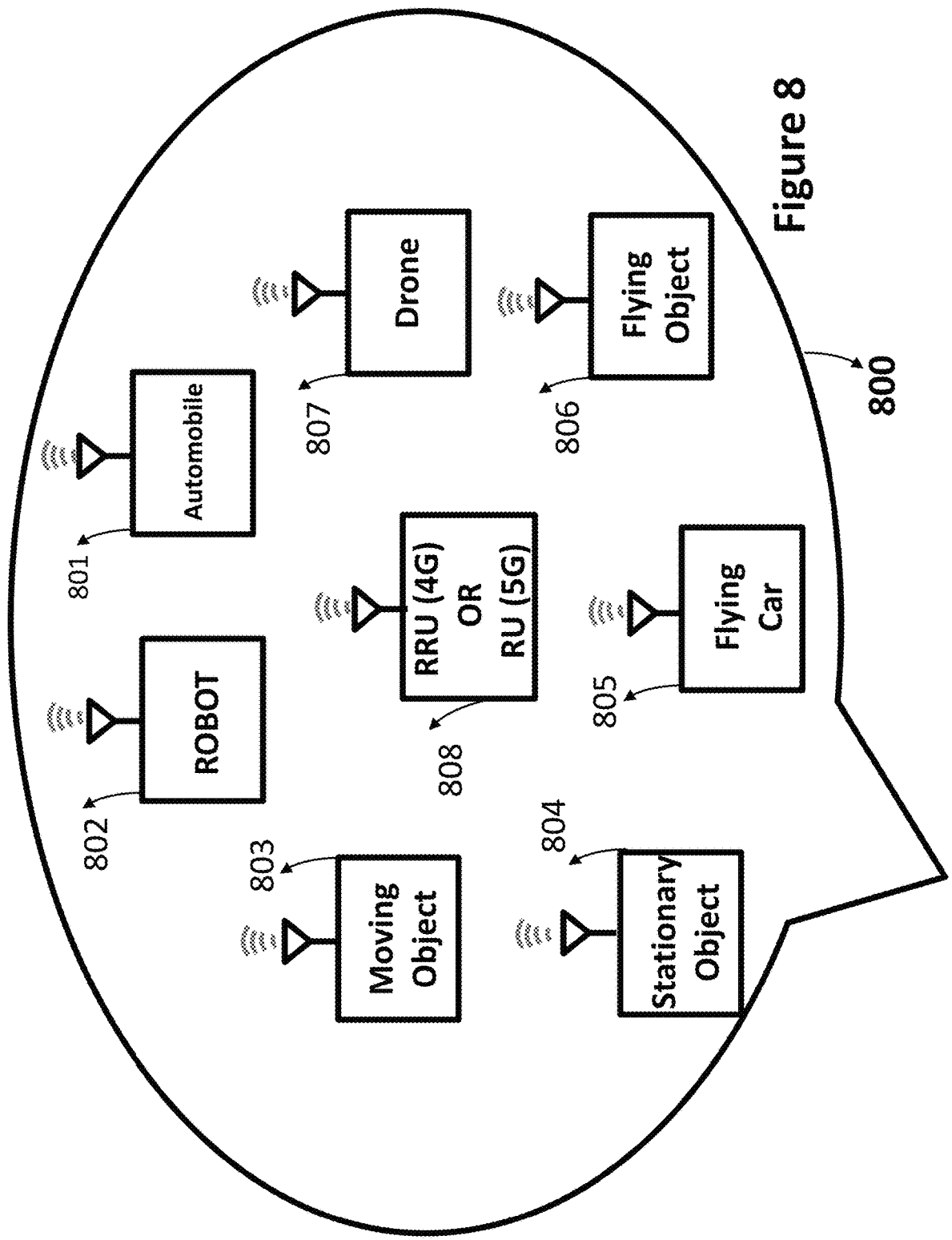
FIG. 8 illustrates moving vehicles, flying vehicles/objects, and stationary objects in an environment communicating with 4G and 5G Remote Radio Unit (RRU) and Radio Unit (RU) respectively

FIG. 8 depicts a smart environment 800 with objects (IoT devices) that communicate with a public or private network. In general, the smart environment 800 in addition to open space consists of various stationary, moving and flying objects (IoT devices) that are capable of wirelessly communicate with other objects (IoT devices) as well as a public or private communication network. In the smart environment 800 all the objects (IoT devices) coexist synchronously in time (time of day) and operate freely without any interruption, interference, and collision.

In one embodiment smart environment 800 includes, among other things, automobile 801, robot 802, moving object 803, stationary object 804, flying car 805, flying object 806, drone 807, and a wireless base station 808 that supports a public or private communication network.

In one embodiment, the wireless base station 808 is part of cellular network 4G, 5G (fifth generation) and beyond.

In one embodiment, the wireless base station 808 is a cellular (4G or 5G and beyond) small cell, macro-cell, micro-cell or picocell.

In another embodiment, the wireless base station 808 is a WiFi router that is connected to the IP network as well as cellular network (4G, 5G and beyond).

In one embodiment, the wireless base station 808 is part of a private network that is connected to IP network as well as cellular network (4G, 5G and beyond).

In one embodiment, wireless base station 808 is a 4G RRU, or a 5G RU.

In another embodiment, the wireless base station communicates with the stationary, moving and flying objects in the smart environment 800 and obtains type, location (obtained from GPS receiver), identity number, signal propagation time through transmitter of the IoT device's wireless transceiver up to the input of transmit antenna, and estimated mass from objects 801, 802, 803, 804, 805, 806 and 807.

In one embodiment, wireless base station 808 in the smart environment 800 broadcast the information obtained from each object 801, 802, 803, 804, 805, 806 and 807 to all objects (IoT devices) in smart environment 800.

In one embodiment, all moving and stationary objects 801, 802, 803, 804, 805, 806 and 807 continuously updates the data it obtains from wireless base station 808 related to other objects in its surrounding smart environment 800.

In another embodiment, the identity number of each object in the smart environment 800 is the object's serial number or an IP address that is an IP4 or IP6.

In one embodiment, the wireless base station 808 uses GPS to obtain clock synchronization and time of day.

In another embodiment, all objects (IoT devices) in the smart environment 800 receive time of day and their location coordinates from GPS receiver.

In another embodiment, a stationary object (IoT device) in the smart environment has its location coordinates manually program to it or obtains from base station 808.

In one embodiment, the wireless base station 808 in smart environment 800 supports IEEE1588 (Institute of electrical and electronic engineering synchronization standard 1588) PTP which provides clock synchronization and time of day for wireless base station 808 through any port in data communication network as well as 4G and 5G network.

In another embodiment, all moving and stationary objects (IoT devices) 801, 802, 803, 804, 805, 806 and 807 also supports IEEE1588 in order to obtain time of day.

In one embodiment, wireless base station 808 broadcasts to each moving and stationary objects (IoT devices) 801, 802, 803, 804, 805, 806 and 807 the absolute time when they can broadcast their information.

In one embodiment, wireless base station 808 broadcasts to each moving and stationary objects (IoT devices) 801, 802, 803, 804, 805, 806 and 807 the absolute time when their sensors can collect data.

In one embodiment, wireless base station 808 broadcasts to each moving and stationary objects (IoT devices) 801, 802, 803, 804, 805, 806 and 807 the absolute time when their wireless sensors can perform wireless ranging to measure a distance and an approaching speed of various objects in their surrounding smart environment.

In one embodiment, wireless base station 808 broadcasts to each moving and stationary objects (IoT devices) 801, 802, 803, 804, 805, 806 and 807 the carrier frequency and modulation for their wireless sensor.

In one embodiment, each moving and stationary objects (IoT devices) 801, 802, 803, 804, 805, 806 and 807 exchange Ethernet packets with wireless base station 808.

In one embodiment, the link between each moving and stationary objects (IoT devices) 801, 802, 803, 804, 805, 806 and 807 and wireless base station 808 is an over the air Ethernet link.

In one embodiment, communication link between each moving and stationary objects (IoT devices) 801, 802, 803, 804, 805, 806 and 807 and the cloud network, data network, and core network through wireless base station 808 supports a single end-to-end Ethernet packet protocol.

In another embodiment, moving and stationary objects (IoT devices) 801, 802, 803, 804, 805, 806 and 807 use their wireless sensor to broadcast their broadcast data.

In one embodiment, moving and stationary objects (IoT devices) 801, 802, 803, 804, 805, 806 and 807 use their wireless transceiver that communicates with 4G and 5G network to broadcast their broadcast data.

In one embodiment, moving and stationary objects (IoT devices) 801, 802, 803, 804, 805, 806 and 807 support WiFi, Bluetooth, or Zigbee transceivers and use them to broadcast their broadcast data.

FIG. 9A depicts OFDM transmit symbol signal 850 before adding cyclic prefix. Both 4G and 5G use OFDM (orthogonal frequency division multiplexing) in their transmit path. The duration of transmit signal is one OFDM symbol 851 for 4G RRU and 5G RU. The transmit signal 850 consists of "n" samples $x_1$ to $x_n$ 852. To eliminate inter-symbol interference "n-m" samples 853 from end of OFDM symbol are copied at the beginning of symbol or some samples from the beginning of OFDM symbol are copied at the end of symbol. The "n-m" samples are called cyclic prefix and the duration of it depends on radius of coverage of RRU and RU transmitters. These "n-m" samples at the receiver of user equipment UE (IoT device) are removed by using correlation before performing the receiver functions.

FIG. 9B shows transmit signal with cyclic prefix 854 that is added at the beginning of transmit symbol which consists of "n" samples $x_1$ to $x_n$ 852. Samples $x_m$ to $x_n$ from end of transmit symbol are copied at the beginning of "n" samples $x_1$ to $x_n$ as cyclic prefix 854. In the UE (IoT device) receiver cyclic prefix 854 is removed from received signal before the receive process starts. The process of removal of cyclic prefix is a circular correlation. The highest correlation is achieved when all samples in cyclic prefix are matched. There is always possible one or more samples in cyclic prefix are not matched due to various impairment and results in lower amount of correlation but still removal of cyclic prefix is possible. Therefore, it is possible to use one or more samples in cyclic prefix to transmit time of day to user equipment UE (IoT device).

In one embodiment of transmit signal 850 one or more samples of cyclic prefix 854 samples $x_m$ to $x_n$ is used to send the time of day to user equipment UEs or IoT devices.

In another embodiment the samples used from cyclic prefix 854 for transmitting time of day are at the start, middle, or end of cyclic prefix 854.

In another embodiment the samples used from cyclic prefix 854 for transmitting time of day are at any location in cyclic prefix 854 and the location do not change until all time of day data is transmitted.

In one embodiment the time of day is sent to user equipment UEs, or IoT devices over a number of transmit OFDM symbols.

In one embodiment the time of day includes date and time of day and date include year, month and day.

In one embodiment the bits in samples from cyclic prefix 854 are used for transmission of time of day to UEs or IoT devices.

In another embodiment the top bits in sample ($x_m$) 855 of cyclic prefix are used to send time of day in order to mitigate effect of any noise, interference or fading.

In one embodiment only one sample of cyclic prefix 854 is used for transmitting the time of day and the first sample that is used for time of day has a detectable bit pattern to indicate that next samples at the same location in next cyclic prefixes contain the time of day.

In one embodiment more than one sample of cyclic prefix 854 is used for transmitting the time of day and the first sample that is used for time of day has a detectable bit pattern to indicate that next samples whether in present cyclic prefix or next cyclic prefixes contain the time of day.

In another embodiment the first sample of first cyclic prefix carries the hour, the first sample of second cyclic prefix carries the seconds, the first sample of third cyclic prefix carries the milliseconds, the first sample of forth cyclic prefix caries the microseconds, the first sample of fifth cyclic prefix caries nanoseconds, and if more accuracies are available the first sample of sixth cyclic prefix carries the picoseconds.

In one embodiment the bits used to represent the time of day are compressed (using one of compression algorithms) in order to use less cyclic prefix samples for transmission of time of day.

There is a time difference between transmissions of two cyclic prefixes. During this time difference the date, hour ($T_h$), second ($T_s$), millisecond ($T_m$), microsecond ($T_\mu$), or nanosecond ($T_n$) of time of day can be incremented and this creates a significant time error between RU/RRU and UEs or IoT devices. Therefore, before sending time of day there is a need to find out if one of ($T_h$), ($T_s$), ($T_m$), ($T_\mu$), or nanosecond ($T_n$) will be incremented during the transmission of complete time of day.

In one embodiment the date, hour ($T_h$), second ($T_s$), millisecond ($T_m$), microsecond ($T_\mu$), or nanosecond ($T_n$) of time of day if needed is incremented before being sent to UE or IoT device.

In another embodiment time of day before being sent to UE or IoT device is adjusted for propagation time of IFFT through transmitter path of RU/RRU or BBU/DU up to antenna in order to reduce the time error between time of day at RU/RRU (or BBU/DU) and UEs or IoT devices.

In one embodiment date and time of day that is sent to UE or IoT device is based on a configurable repeating/updating time interval.

FIG. 9C depicts a typical coverage of RU/RRU in a 4G/5G wireless network. UEs or IoT devices A, B, and C are at different distance from RU/RRU. Therefore, UEs or IoT devices A, B, and C receive time of day at different time which results in time error between UEs or IoT devices. These UEs or IoT devices when transmit to RU/RRU need to adjust their transmission time based on their time alignment or time advance which compensate for their difference in distance from RU/RRU. The time alignment or time advance is used to eliminate the error in time of day at UEs or IoT devices A, B, and C and make all UEs or IoT devices have the same time of day.

In one embodiment UEs or IoT devices that are at different distance from their common RU/RRU use their time alignment or time advance to adjust the time of day received from RU/RRU in order to have the same time of day.

In 4G and 5G it is possible to use downlink methods similar to cyclic prefix to transmit time of day to UEs or IoT devices. These methods can utilize unused subcarriers or unused bits or messages in various downlink channels.

For instance in 4G LTE there are two cell search procedures: one for initial synchronization and another for detecting neighbor cells in preparation for handover. In both cases the UE or IoT device uses two special signals broadcast on each RRU: Primary Synchronization Sequence (PSS) and Secondary Synchronization Sequence (SSS). The detection of these signals allows the UE or IoT device to complete time and frequency synchronization and to acquire useful system parameters such as cell identity, cyclic prefix length, and access mode (FDD/TDD).

In the frequency domain, the PSS and SSS occupy the central six resource blocks (RBs, 72 subcarriers), irrespective of the system channel bandwidth, which allows the UE or IoT device to synchronize to the network without a priori knowledge of the allocated bandwidth. The synchronization sequences use 62 sub-carriers in total, with 31 sub-carriers mapped on each side of the DC sub-carrier which is not used. This leaves 5 sub-carriers at each extremity of the 6 central RBs unused. These 10 unused sub-carriers can be used to transmit time of day to UEs or IoT devices. Similar to cyclic prefix the time of day should be adjusted for propagation time through transmitter path up to transmit antenna port in order to minimize time difference between RU/RRU and UEs or IoT devices. During transmission of the time of day it is possible one of ($T_h$), ($T_s$), ($T_m$), ($T_\mu$), and ($T_n$) has to be incremented before being sent to UEs or IoT devices due to the time it takes to transmit the time of day.

In one embodiment unused downlink sub-carriers is used to transmit time of day to UEs or IoT devices.

It is also possible to utilize unused bits or messages in various downlink channels in 4G or 5G to transmit the time of day similar to unused sub-carriers.

In another embodiment unused bits or messages in various downlink channels is used to transmit time of day to UEs or IoT devices.

In one embodiment when unused downlink sub-carrier, bits, or messages are used the day, hour ($T_h$), second ($T_s$), millisecond ($T_m$), microsecond ($T_\mu$), or nanoseconds ($T_n$), of time of day if needed is incremented before being sent to UE or IoT device.

FIG. 10 depicts a broadcast frame 880.

In one embodiment the broadcast frame 880 uses similar structure as Ethernet frame 870.

In one embodiment the broadcast frame 880 sends the time of day in payload.

In one embodiment the broadcast frame 880 instead of sending destination address sends the time of day.

In another embodiment the source address of the broadcast frame 880 is the identity code, or IP address of a transceiver (IoT device, sensor, WiFi router, RRU, RU, private base station, or any other wireless device).

Figure 11:
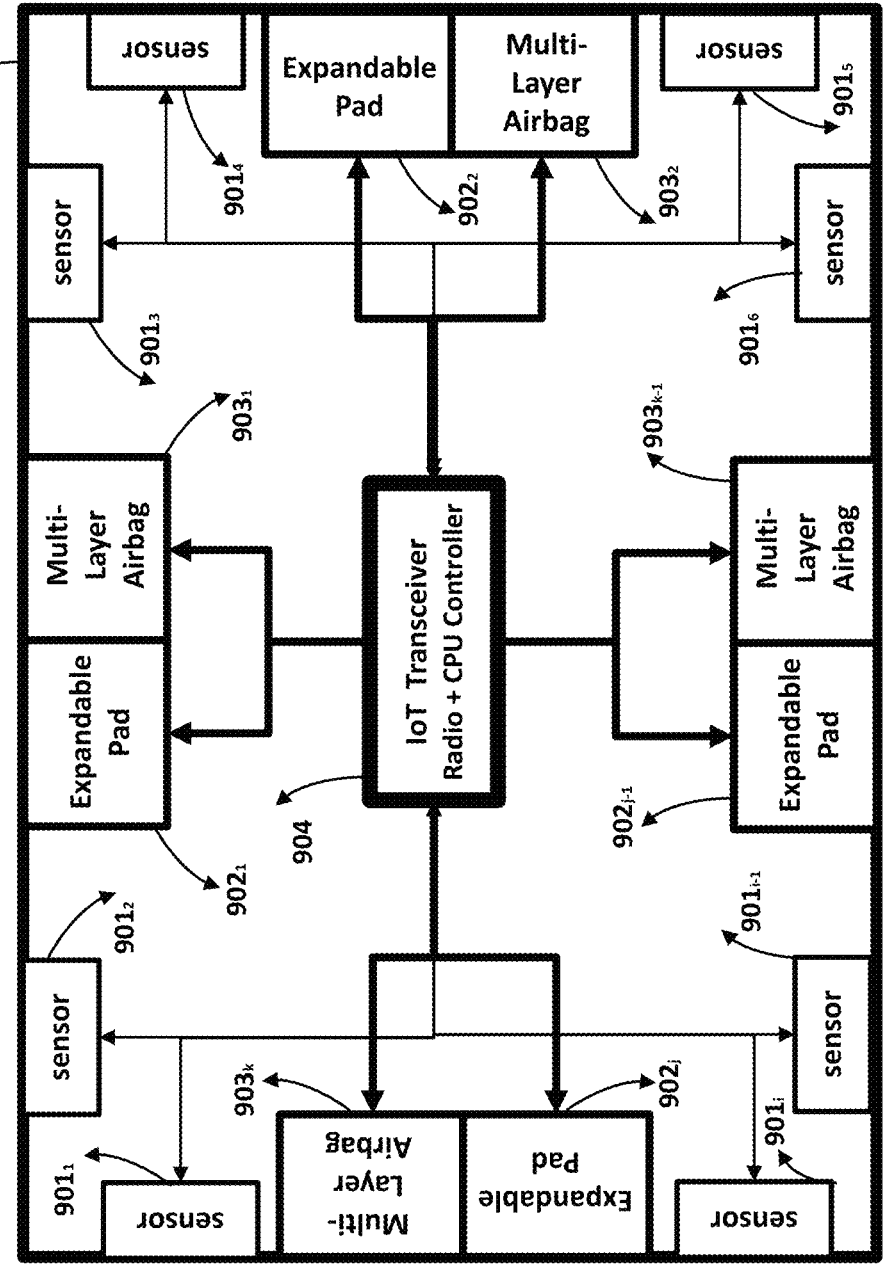
FIG. 11 depicts an IoT protection system for moving and stationary objects

FIG. 11 illustrates an embodiment of a protection system for vehicle/object (IoT device) 900. In general, the protection system for vehicle/object (IoT device) 900 provides external body protection by applying voltage to two ends of an expandable pad and/or inflating a multilayer airbag. The IoT transceiver 904 receives an information data related to operation status of the protection system for vehicle/object (IoT device) 900 and an information data from various objects in surrounding environment of the vehicle/object (IoT device) 900 from sensors $901_1$ to $901_i$ to detect any malfunction of the protection system of vehicle/object (IoT device) 900 or approaching of external objects that results in an impact. When IoT transceiver 904 detects a potential impact based on its artificial intelligence analyses of the information data received from sensors $901_1$ to $901_i$ which include information data related to internal devices and external objects in the surrounding environment, it broadcasts its problem and activates one or more of the expandable pads $902_1$ to $902_j$ and/or activates one or more of the multilayer airbag $903_1$ to $903_k$ to minimize the damage to the vehicle/object (IoT device) 900 due to impact.

Protection system for vehicle/object (IoT device) 900 includes, among other things, sensors $901_1$ to $901_i$, IoT device's transceiver 904, expandable pads $902_1$ to $902_j$, and multilayer airbags $903_1$ to $903_k$.

In one embodiment the protection system acts as a stand-alone IoT device used by various objects.

In one embodiment the protection system obtains time of day and date directly or through the vehicle/object (IoT device) 900 that uses the protection system.

In another embodiment the protection system uses time of day to define a time for operation of various sensors $901_1$ to $901_i$.

In one embodiment, the vehicle/object (IoT device) 900 is a moving object, stationary object, or flying object.

In one embodiment of the protection system for vehicle/object (IoT device) 900, multiple expandable pads $902_1$ to $902_j$ and multiple multilayer airbags $903_1$ to $903_k$ are mounted on all external sides of vehicle/object (IoT device) 900 and provide protection for impacts due to external objects at any external side of vehicle/object (IoT device) 900.

In one embodiment of the protection system for vehicle/object (IoT device) 900, the expandable pads $902_1$ to $902_j$ and multilayer airbags $903_1$ to $903_k$ are mounted on the main body frame of the vehicle/object (IoT device) 900 to provide a firm and strong support.

In another embodiment of the protection system for vehicle/object (IoT device) 900, by activating expandable pads $902_1$ to $902_j$ and/or multilayer airbags $903_1$ to $903_k$ the impact force to vehicle/object (IoT device) 900 will be lowered by absorption or diffraction and provides more protection to the passengers of vehicle/object (IoT device) 900.

In one embodiment of the protection system for vehicle/object (IoT device) 900, one or more of the multilayer airbags $903_1$ to $903_k$ at one or multiple sides of the vehicle/object (IoT device) 900 is inflated to protect the external of vehicle/object (IoT device) 900 from fall, crash or impact with an external object.

In one embodiment of the protection system for vehicle/object (IoT device) 900, one or more of the expandable pads $902_1$ to $902_j$ at one or multiple sides of the vehicle/object (IoT device) 900 is activated by applying voltage to two ends of expandable pad to protect the external of vehicle/object (IoT device) 900 from fall, crash or impact with an external object.

In one embodiment of the protection system for vehicle/object (IoT device) 900, IoT transceiver 904 resets, and configures itself based on configuration data stored in its memory and then starts to execute artificial intelligence executable software which controls all aspects of navigation and protection of the vehicle/object (IoT device) 900 using an information data provided by sensors $901_1$ to $901_i$.

In one embodiment of the protection system for vehicle/object (IoT device) 900, multiple sensors $901_1$ to $901_i$ are distributed at various locations internal and external to vehicle/object (IoT device) 900 and each has a unique IP address which is used to communicate with the IoT transceiver 904 to avoid collision or confusion of the information data received by the IoT transceiver 904 from the sensors internal or external to the vehicle/object (IoT device) 900.

In one embodiment of the protection system for vehicle/object (IoT device) 900, the sensors $901_1$ to $901_i$ can be at least one of image sensor, wireless sensor, radar, heat sensor, speed sensor, acceleration sensor, ultrasonic sensor, proximity sensor, pressure sensor, G (gravity) sensor, IR (infrared) sensor and others.

In one embodiment of the protection system for vehicle/object (IoT device) 900, a wireless sensor transmits (records completion of transmission at input of transmit antenna port) a coded signal similar to a unique identity code signal or a unique IP address signal and receives (record the completion of reception at receive antenna port) a reflected signal of the unique identity code signal, or the unique IP address signal from objects in surrounding environment of the vehicle/object (IoT device) 900 to avoid collision.

In another embodiment of the protection system for vehicle/object (IoT device) 900, the wireless sensor uses the time of completion of transmission of the unique identity code signal or the unique IP address signal at its transmit antenna port and the time of completion of reception of reflected signal of the unique identity code signal or the unique IP address signal at its receive antenna port to estimate free space traveling time of the unique identity code signal or the unique IP address signal to calculate a distance and an approaching speed of an object in the surrounding environment of the vehicle/object (IoT device) 900.

In one embodiment of the protection system for vehicle/object (IoT device) 900, the wireless sensor uses time stamp (time of day) received from wireless sensor of protection system that belongs to another vehicle/object (IoT device) to estimate the distance between the two vehicle/object (IoT device).

In one embodiment of the protection system for vehicle/object (IoT device) 900, the wireless sensor uses time of day (time stamp) of broadcast data at the antenna port of transmitter of the wireless sensor of a protection system that belongs to another vehicle/object (IoT device) and the time of day its own receiver receives the time stamp at its receiver antenna port to estimate the free space traveling time of the time stamp in the broadcast data.

Then the free space traveling time is used to calculate the distance between the two vehicles/objects (IoT devices).

In another embodiment, the wireless sensor uses one IP address to communicate with IoT transceiver 904 and a second IP address for transmitting a unique IP address signal over the air to monitor objects in surrounding environment.

In another embodiment, the wireless sensor uses a single IP4 or IP6 address for both communicating with IoT transceiver 904 and transmit signal over the air.

In one embodiment of the protection system for vehicle/object (IoT device) 900, IoT transceiver 904 communicates with at least one of a cellular network (4G, 5G and beyond), a WiFi router, and a private network to obtain an information data about objects in its surrounding environment.

In one embodiment of the protection system for vehicle/object (IoT device) 900, the IoT transceiver 904 supports IEEE1588 to synchronize with at least one of a cellular base station (4G, 5G and beyond), a WiFi router, and a private network to obtain time of day.

In one embodiment of the protection system for vehicle/object 900, in order to avoid collision, at least one of a cellular base station (4G, 5G and beyond), a WiFi router, and a private network broadcasts to vehicle/object (IoT device) 900 the absolute time when its wireless sensor can transmit a unique IP address signal and receive the reflected unique IP address signal from various objects in the surrounding environment to measure a distance and an approaching speed of various objects.

In one embodiment of the protection system for vehicle/object (IoT device) 900, in order to avoid collision, at least one of a cellular base station (4G, 5G and beyond), a WiFi router, and a private network broadcasts to vehicle/object (IoT device) 900 the absolute time when its wireless sensor can broadcast its information data.

In another embodiment of the protection system for vehicle/object (IoT device) 900, the wireless sensor, over the air, broadcasts information data that includes a time stamp indicating time of day, a method the time of day was obtained (IEEE1588, cyclic prefix, downlink unused subcarriers, downlink channels unused bits/messages or GPS), type of the vehicle/object (IoT device) 900, location (obtained from GPS receiver), the identity number or IP address of wireless sensor, signal propagation time through transmitter of the wireless sensor up to the input of transmit antenna, and estimated mass of the vehicle/object (IoT device) 900.

In one embodiment of the protection system for vehicle/object (IoT device) 900, two or more type of sensors can be used to better monitor the surrounding environment of the vehicle/object (IoT device) 900 and calculate and estimate parameters of the surrounding environment.

In one embodiment of the protection system for vehicle/object (IoT device) 900, an image sensor is used to monitor the vehicle/object (IoT device) 900 surrounding environment, and independently calculate and estimate a distance and an approaching speed of an object in its surrounding environment.

In one embodiment of the protection system for vehicle/object (IoT device) 900, using typical objects in an environment an image verification data base and a distance calibration data base that relates the size of the image to distance of the object from the image sensor is created and stored in memory of the image sensor.

In one embodiment of the protection system for vehicle/object (IoT device) 900, a wireless sensor and an image sensor are used to monitor the vehicle/object (IoT device) 900 surrounding environment, and each independently calculate and estimate a distance and an approaching speed of objects in its surrounding environment and use the information data to make a better decision to activate one or more multilayer air bags and/or one or more expandable pads.

In another embodiment, the vehicle/object (IoT device) 900 can be an automobile, a robot, a flying car, a small plane, a drone, a glider, a human or any flying and moving vehicle/device/object/equipment.

Figure 12:
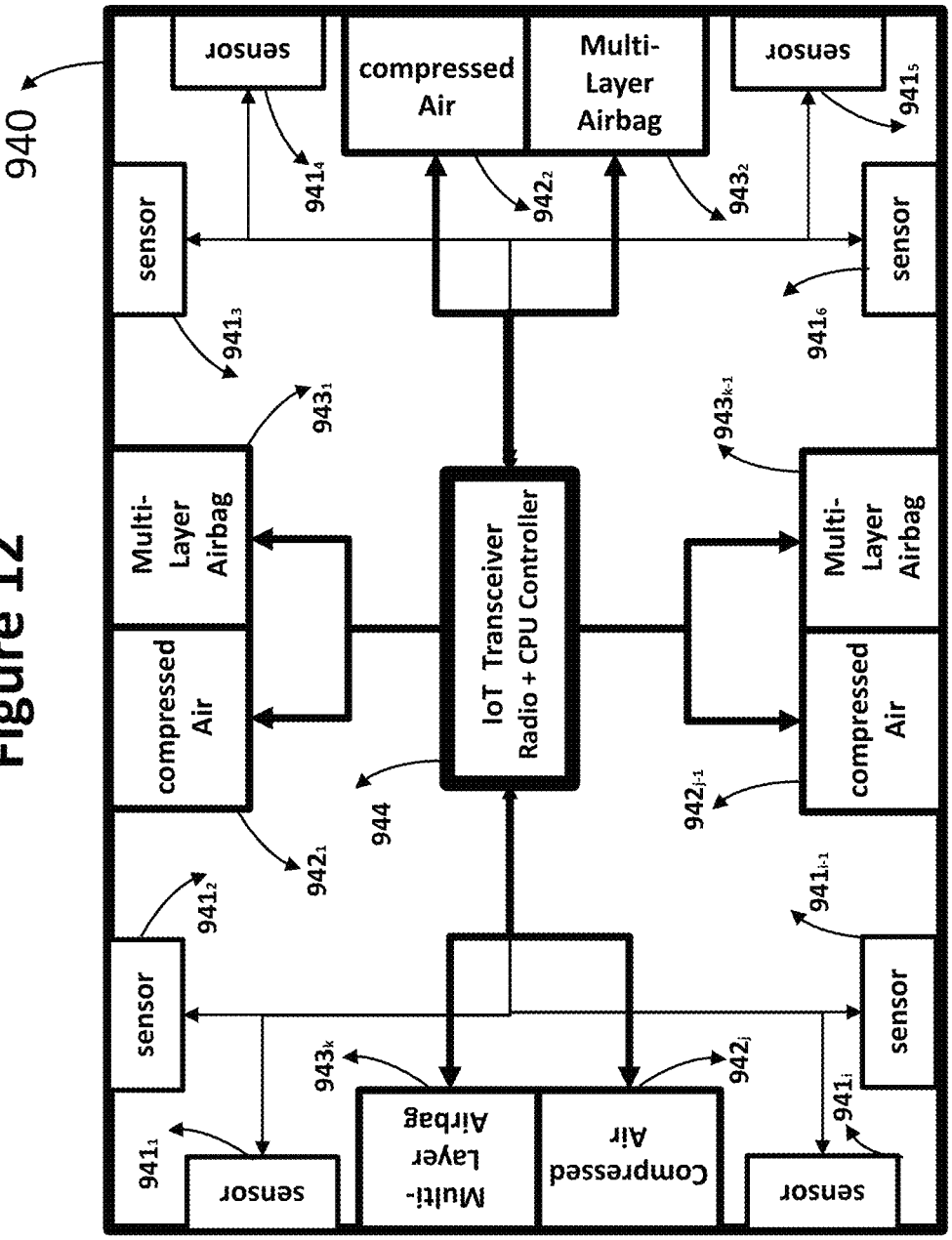
FIG. 12 illustrates an IoT protection system for flying objects

FIG. 12 illustrates an embodiment of a flying object (IoT device) 940. In general, the flying object (IoT device) 940 provides protection by releasing compressed air and/or inflating a multilayer airbag. The IoT transceiver 944 receives information data related to operation status and surrounding environment of the flying object (IoT device) 940 from sensors $941_1$ to $941_i$ to detect any malfunction of the flying object (IoT device) 940 that results in loss of altitude, vertical fall due to gravity force and eventual crash to the ground. When IoT transceiver 944 detects a fall through its CPU controller artificial intelligence which analyses the information data received from sensors $941_1$ to $941_i$ which include information data related to devices internal to flying object (IoT device) 940 and its surrounding environment's parameters, it broadcasts its problem and activates at least one of the compressed air $942_1$ to $942_j$ to release air to slow down the fall at certain distance from ground before the flying object (IoT device) 940 crashes and then activates one or more of the multilayer airbag 943$_1$ to 943$_k$ for smoother landing or crash.

Flying object (IoT device) 940 includes, among other things, sensors 941$_1$ to 941$_i$, IoT transceiver 944, compressed air units 942$_1$ to 942$_j$, and multilayer airbags 943$_1$ to 943$_k$.

In one embodiment of flying object (IoT device) 940, activation of a subset of compressed air units 942$_1$ to 942$_j$ and multilayer airbags 943$_1$ to 943$_k$ allow for smoother crash or landing on any side of the flying object (IoT device) 940.

In one embodiment, flying object (IoT device) 940 uses a centralized compressed air unit with multiple outlets at different sides of the flying object (IoT device) 940 and when activated the air is released only from the outlets on the side that flying object (IoT device) 940 lands or crash to the ground.

In one embodiment of flying object (IoT device) 940, one or more of the multilayer airbags 943$_1$ to 943$_k$ at one or multiple sides of the flying object (IoT device) 940 are inflated to make the crash or landing as smooth as possible.

In one embodiment of flying object (IoT device) 940, IoT transceiver 944 resets, and configures itself based on a configuration data stored in its memory and then starts executing an artificial intelligence software which controls all aspects of navigation and protection of the flying object (IoT device) 940 using information data provided by sensors 941$_1$ to 941$_i$.

In one embodiment of flying object (IoT device) 940, each sensor has an IP address which is used to communicate with the IoT transceiver 944 similar to an IP network to avoid collision or confusion of the information data received by the IoT transceiver 944 from sensors internal or external to the flying object (IoT device) 940.

In one embodiment of flying object (IoT device) 940, each sensor sends its information data to the IoT transceiver 944 by using wireless and/or wired communication.

In one embodiment of flying object (IoT device) 940, the sensors 941$_1$ to 941$_i$ can be at least one of image sensor, wireless sensor, radar, heat sensor, speed sensor, acceleration sensor, ultrasonic sensor, proximity sensor, pressure sensor, G sensor, IR (infrared) sensor and others.

In another embodiment, the flying object (IoT device) 940 can be a drone, a flying car, a small plane, a glider, and a flying human or robot.

Figure 13:
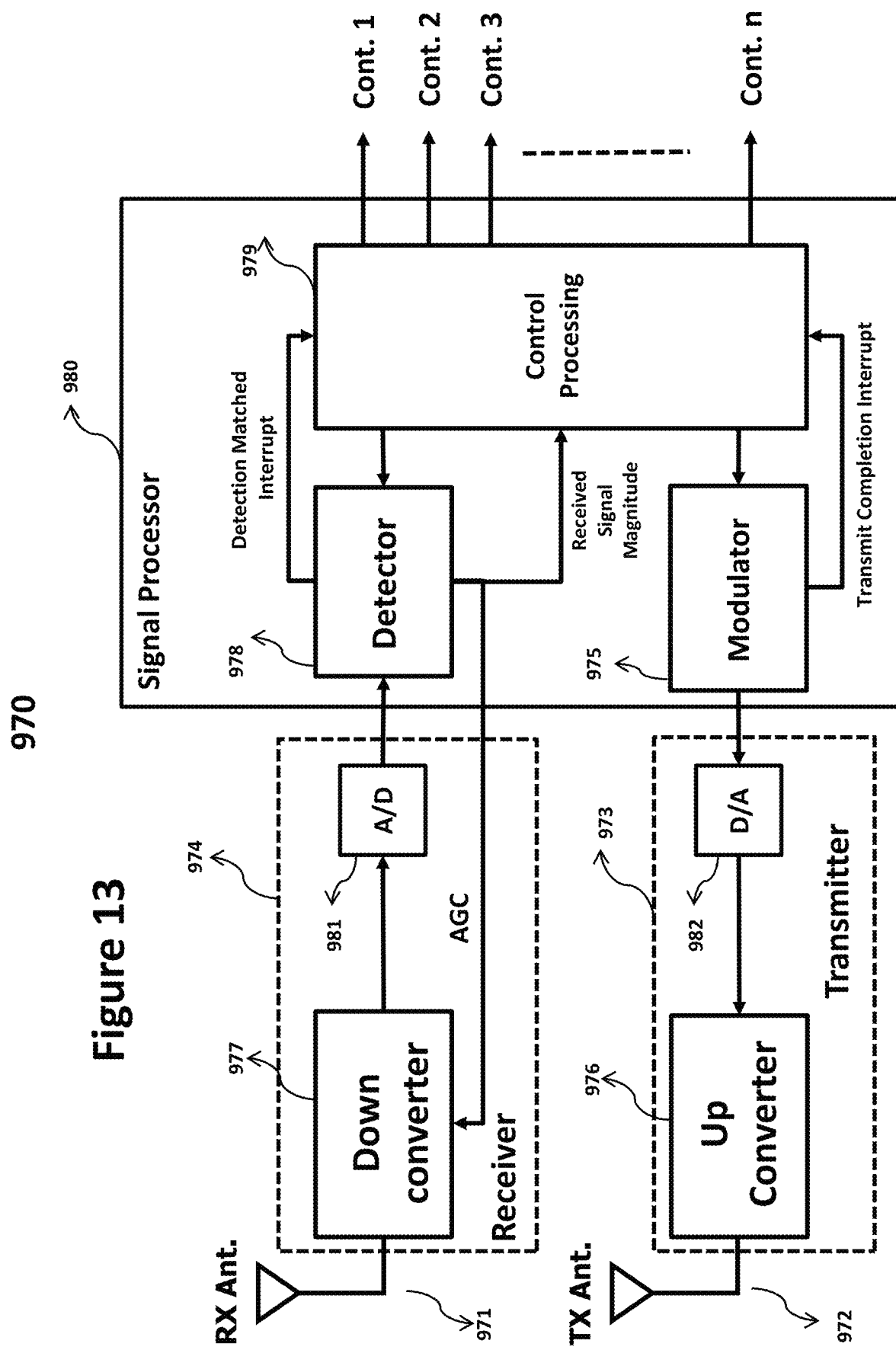
FIG. 13 depicts an embodiment of a wireless sensing system

FIG. 13 depicts an embodiment of wireless sensor system 970. In general, wireless sensor system 970 facilitates estimation and calculation of certain environment's parameters by transmitting a coded signal like an unique IP address signal generated or selected by a control processor 979 through a modulator 975, a transmitter 973 and antenna 972 and then receiving the attenuated version of reflected coded signal by an antenna 971, receiver 974 and detector 978. For example, control processor 979 selects an IP address pattern from a pool of IP address, send it to modulator 975 for modulation then the modulated signal is sent to transmitter 973 to be converted to analog signal by digital-to-analog (D/A) converter 982 and up converted to carrier frequency by up convertor 976 for transmission through antenna 972. The modulator 975 also sends the time of completion of modulation to control processor 979. Then the reflected transmit signal from an object in the environment is received by antenna 971 and receiver 974, where it is down converted by down convertor 977 and converted to digital signal by analog-to-digital (A/D) converter 981. The digitized received signal is processed in signal processing unit 980, where it is detected by detector 978 and detection time is sent to control processor 979. The digitized down converted received signal also facilitates measurement of received signal strength intensity (RSSI) to provide to control processor 979.

Wireless sensor system 970 includes, among other things, signal processor 980, transmitter 973, transmit antenna 972, receive antenna 971, and receiver 974.

In one embodiment, signal processor 980, transmit antenna 972, transmitter 973, receive antenna 971, and receiver 974 are components of wireless sensor system 970 that could be used for various applications. For example, it can be used to communicate with cellular network (4G, 5G and beyond), a private network, a WiFi network, for broadcasting, communication with the cloud, and etc.

In one embodiment, wireless sensor system 970 receives information about its surrounding environment which includes various objects and their types from cellular network (4G, 5G and beyond), WiFi network or a private network. Wireless sensor system 970 also receives an IP address to use for its operation or a pool of IP address it can store and use as needed.

In another embodiment, wireless sensor system 970 uses GPS to obtain time of day, clock synchronization and location coordinates.

In one embodiment, wireless sensor system 970 uses IEEE1588 and through cellular network (4G, 5G and beyond), WiFi network, a private network, or another wireless sensor system obtains time of the day and clock synchronization.

In another embodiment, wireless sensor system 970 uses IEEE1588 PTP to obtain clock synchronization (syncE also can be used for clock synchronization) and time of day from a central CPU controller that it communicates with.

In another embodiment, wireless sensor system 970 obtains its IP address from a central CPU controller that it communicates with.

In another embodiment, wireless sensor system 970 receives an absolute time for its activity such as transmission, reception, communication and broadcasting from cellular network (4G, 5G and beyond), WiFi network, a private network, or a central CPU controller that it communicates with.

In one embodiment, wireless sensor system 970 communicates its information and parameters to cellular network (4G, 5G and beyond), WiFi network, a private network, or a central CPU controller that it communicates with.

In one embodiment, wireless sensor system 970 receives an information data from its surrounding environment which is updated in real time from cellular network (4G, 5G and beyond), WiFi network or a private network, or a central CPU controller that it communicates with.

In one embodiment, wireless sensor system 970 broadcasts its information to other wireless sensors that belong to various moving or stationary objects in its surrounding environment.

In another embodiment, wireless sensor system 970 fragments its transmit signal to two or more fragment signals, transmits each fragment signal and receives the reflection of each fragment signal from various objects in its surrounding environment before transmission and reception of next fragment signal.

In one embodiment, wireless sensor system 970 supports WiFi, Bluetooth, Zigbee or any other over the air protocol as well as physical layer.

In another embodiment, wireless sensor system 970 is used for other applications and transmits and receives Ethernet frames over the air.

In one embodiment, signal processor 980 that processes both transmit and receive signal comprises of control processor 979, modulator 975, and detector 978.

Signal processor 980 processes an information data transmitted from transmitter 973 through antenna 972 and an information data received from receiver 974 through receive antenna 971. The signal processor 980 also provides gain control for receiver and facilitates change of transceiver operating frequency and modulation. Signal processor 980 typically utilizes appropriate hardware and software algorithm to properly process the information data.

Wireless sensor system 970 can be any wireless transceiver that is able to wirelessly transmit communication signals. Wireless sensor system 970 is disposed on any physical platform that is conductive to effectively transmit the signals.

In one embodiment, communications through wireless system 970 are by a transmit antenna 972 and a received antenna 971. Transmit and receive antennas are physically separated to provide sufficient isolation between transmit and receive antennas. The transmit antenna 972 and the received antenna 971 can also be common or one antenna.

In one embodiment, communication through wireless system 970 is by a single antenna. In general at any specified period of time the antenna is selected by a switch and/or a circulator.

Signal Processor 980 has a variety of functions. In general, signal processor 980 is utilized for signal processing, calculation, estimation, activities, methods, procedures, and tools that pertain to the operation, administration, maintenance, and provisioning of wireless sensor 970. In one embodiment, signal processor 980 includes a database that is used for various applications. The database can be utilized for analyzing statistics in real-time.

Signal processor 980 also has a variety of thresholds. In general, signal processor 980 provides controls to various components that are connected to it. Moreover, signal processor 980 is a high capacity communication facility that connects primary nodes.

In one embodiment the wireless sensors system 970 uses microwave, or mili-metric wave transceiver.

In one embodiment, wireless sensor system 970 is controlled by control processor 979. The control processor 979 controls a transmit signal duration and number of times the transmit signal is transmitted by wireless sensor system 970. Control processor 979 also coordinates the transmit time and receive time period for the wireless sensors 970.

In one embodiment the wireless sensor system 970 can be used for body armors, automobile, robots, drone, and any other stationary and moving equipment.

Figure 14A:
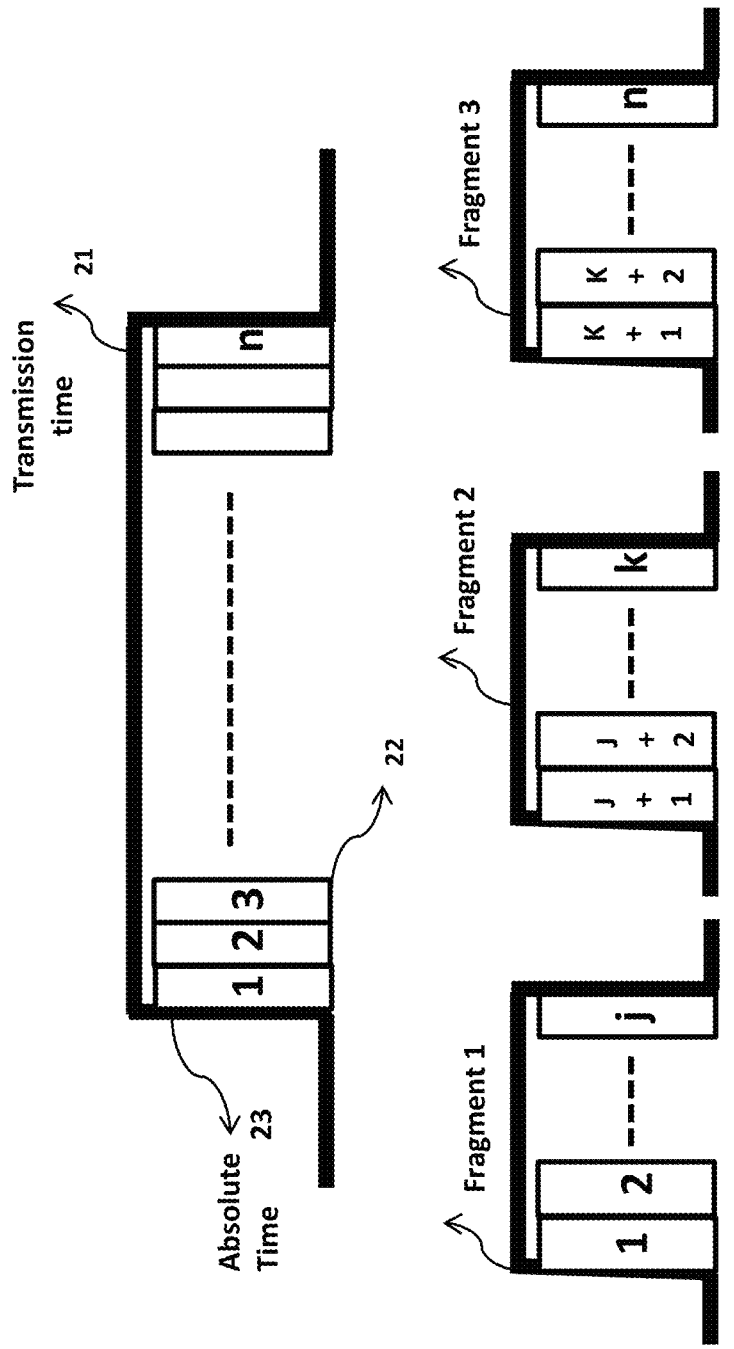

FIG. 14A depicts an embodiment of wireless sensor system 970 (defined in FIG. 13) transmit signal. The transmit signal has a transmission time (duration) 21 and a bit pattern 22. Pattern 22 can be a unique identity code, a unique IP address, or a random pattern which is generated by control processor 979.

In one embodiment of wireless sensor system 970 used in a protection system of a moving or flying vehicle/object defined in FIGS. 11 and 12, the pattern 22 is assigned to wireless sensor system 970 at manufacturing.

In one embodiment of wireless sensor system 970, the random pattern 22 may be changed after being used a few times based on the artificial intelligence in the controller 979 which evaluates the receive signal information data from wireless sensor system 970. The change of transmit pattern 22 signal is for avoiding any collision or false detection from other signals in the surrounding environment.

In one embodiment of wireless sensor system 970 the transmit signal 22 is an IP address (or identity code) unique to a protection system using the wireless sensor 970. The IP address (or identity code) can be assign to wireless system 970 at manufacturing. The IP address (or identity code) can also be assign to wireless sensor system 970 on the field by user. The IP address can be assigned each time the wireless sensor system 970 is turned on the same way that an Internet of things (IoT) device receives its IP address. The IP address (or identity code) can also be taken from a pool of IP addresses (or identity codes) stored in the control processor 979 memory or a removable memory card which can be similar to a subscriber identity module (SIM) card.

In one embodiment of wireless sensor 970, the transmit pattern duration 21 depends on the number of bit pulses in the transmit signal pattern and transmit signal duration depends on carrier frequency, bandwidth, and modulation level of wireless sensor 970. The higher the number of bits in transmits identity code, IP address, or random pattern the longer the transmit signal duration.

In one embodiment of wireless sensor 970, the number of bits in the pattern 22 defines the accuracy of the receiver detection.

In another embodiment, the transmit bit pattern 22 is fragmented to smaller bit patterns, shown in FIG. 14A, to allow use of lower carrier frequency, less bandwidth, or lower level modulation for wireless sensor 970.

In one embodiment, wireless sensor system 970 transmits the first fragment with "j" bits, receives the reflected transmit signal from objects in surrounding environment of wireless sensor system 970, then transmit the second fragment with "k-j" bits, and finally wireless sensor system 970 transmits the last fragment with "n-j-k" bits and receives the reflected transmit signal from objects in surrounding environment of wireless sensor system 970 for detection of the transmit bit pattern.

In another embodiment, the fragment bit patterns can have equal number of bits, or different number of bits.

In one embodiment of wireless sensor system 970, the start of transmission time 21 or start of first bit in bit pattern 22 is an absolute time 23 that is configured in the wireless sensor system 970. This absolute time is derived from time of day wireless sensor system 970 obtains from GPS receiver, cellular network (4G, 5G and beyond), WiFi network, a private network, or a central controller that communicate with. The absolute time can also be sent to wireless sensor 970 by a cellular network (4G, 5G and beyond), WiFi network or a private network. The absolute time can be first microsecond in a millisecond, or the nth microsecond after the start of a millisecond.

In one embodiment, the absolute time can be any nanosecond within a microsecond period, such as $1^{st}$ nanosecond, kth nanosecond, nth nanosecond, and etc.

In one embodiment of wireless sensor 970, the time of day obtained from GPS receiver or IEEE1588 through a 4G RRU or 5G RU 808 supporting a cellular network (4G, 5G and beyond), a WiFi network or a private network has accuracy within a few nanosecond, fraction of microsecond, or fraction of nanosecond.

In one embodiment the time of day obtained from GPS receiver or IEEE1588 through a 4G RRU or 5G RU 808 (FIG. 8) supporting a cellular network (4G, 5G and beyond), a WiFi network or a private network is based on Coordinated Universal Time (UTC).

In another embodiment, the broadcast absolute time for wireless sensor 970 used in the smart environment 700 and 800 defined in FIGS. 7 and 8 helps to avoid any collision when wireless sensors from various objects broadcast their information in the smart environment 700 and 800.

Figure 14B:
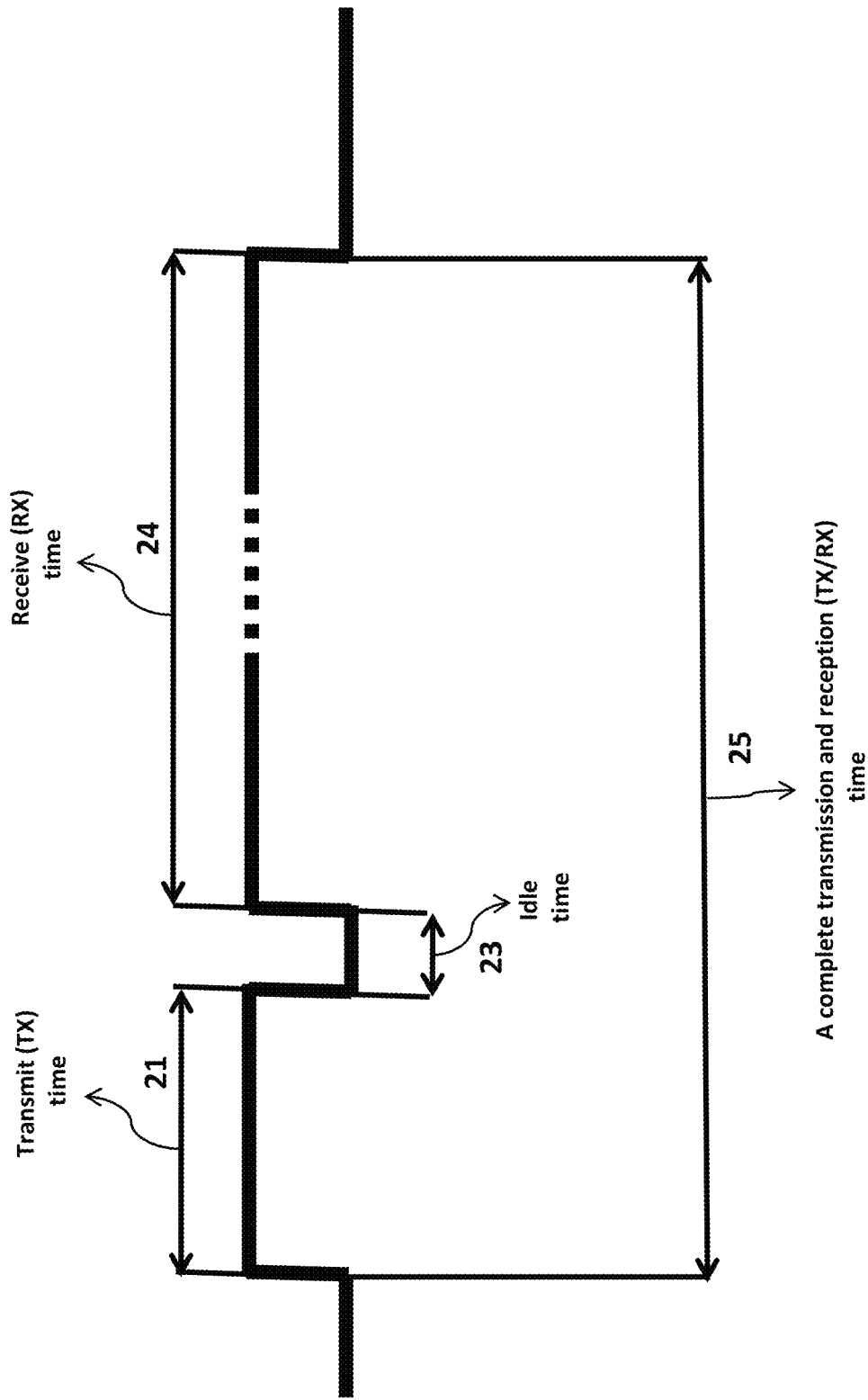

FIG. 14B shows the duration of a complete single transmission and reception (single measurement time) 25 for wireless sensor system 970. The complete transmission and reception duration comprises of the transmit time (duration) 21, idle time 23 and receive duration 24.

In one embodiment of wireless sensor system 970, the idle time 23 can be zero. The idle time can vary based on proximity of an object to wireless sensor system 970 in its surrounding environment. The closer the object the smaller the idle time 23 is.

In one embodiment of wireless sensor system 970, the reception time 24 depends on the monitoring radius of surrounding environment of the wireless sensor system 970. The bigger the radius of monitoring the longer the reception time of wireless sensor system 970 is.

Figure 14C:
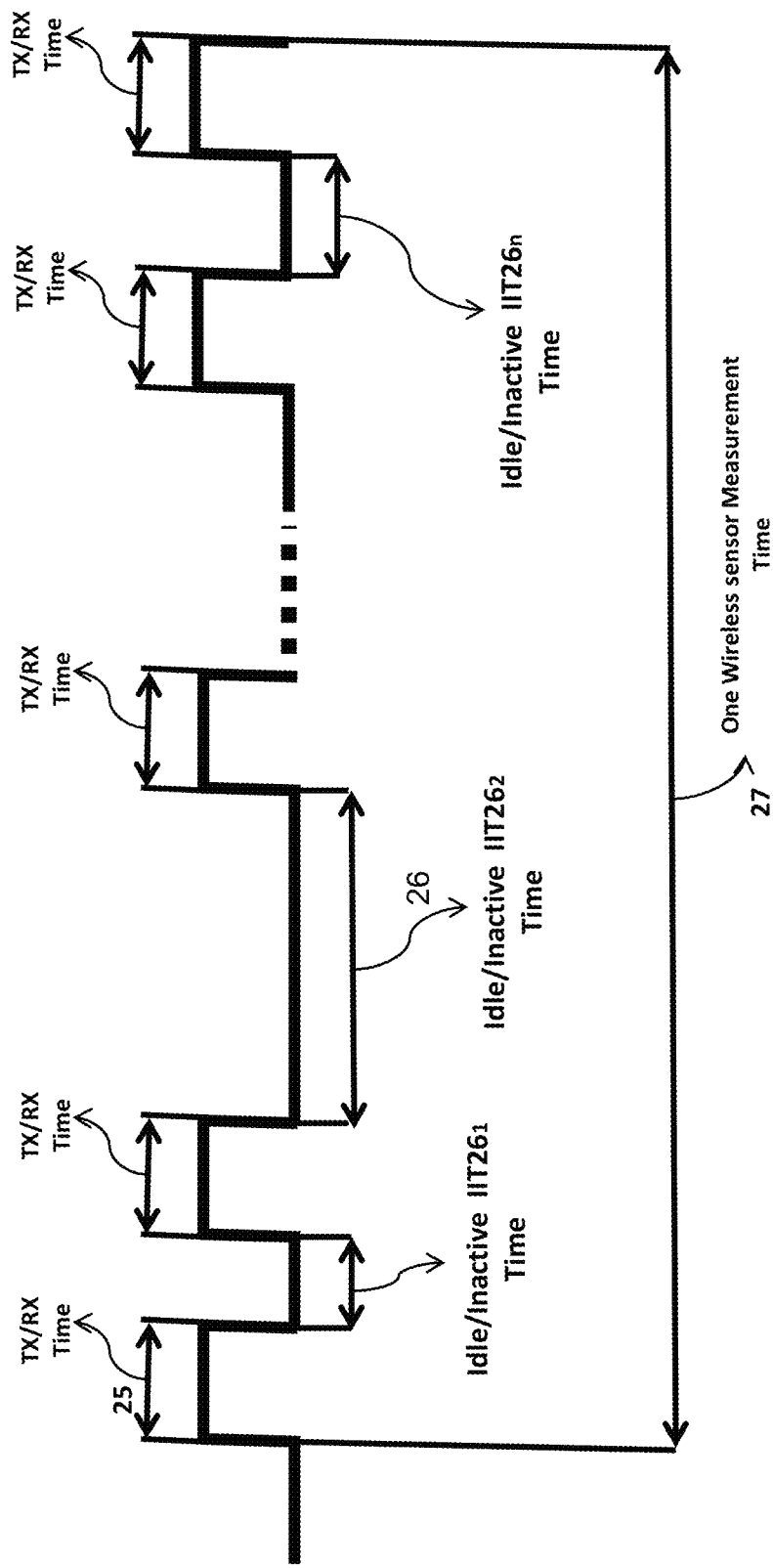

FIG. 14C shows the duration of a complete measurement time 27 of wireless sensor system 970. It comprises of "n+1" single complete transmission and reception (single measurement) times 25 and the idle/inactive times $IIT26_1$ to $IIT26_n$ between single complete transmission and reception (single measurement) times.

In one embodiment of wireless sensor system 970, idle/inactive times $IIT26_1$ to $IIT26_n$ can have the same duration or randomly different duration based on artificial intelligence assessments. Artificial intelligence within wireless sensor system 970 control processor or control processor of a protection system that uses the wireless sensor defines the idle/inactive time duration to avoid any reception collision with transmit signals from other devices in the surrounding environment of the wireless sensor system 970.

In one embodiment of wireless sensor system 970, the artificial intelligence within the control processor of wireless sensor system 970 or control processor of a protection system that uses the wireless sensor can use a number of measurement times 27 for assessment of the surrounding environment before deciding to activate any function or devices.

FIG. 14D depicts the duration of a complete measurement time 27 and communication/broadcasting/monitoring time 29 of wireless sensor system 970.

In one embodiment, the communication time, broadcast time and monitoring time of wireless sensor system 970 are all achieved during time 28 assigned for this task.

In another embodiment, wireless sensor system 970 only communicates with an IoT device, a cellular network (4G, 5G and beyond), a WiFi network or a private network during time 28.

In another embodiment, wireless sensor system 970 performs only over the air broadcasting task during time 28.

In one embodiment, wireless sensor system 970 performs only monitoring of broadcast information from other objects in its surrounding environment during time 28.

In another embodiment, wireless sensor system 970 performs two of three tasks (communication, broadcast, monitor) during time 28.

Figure 15:
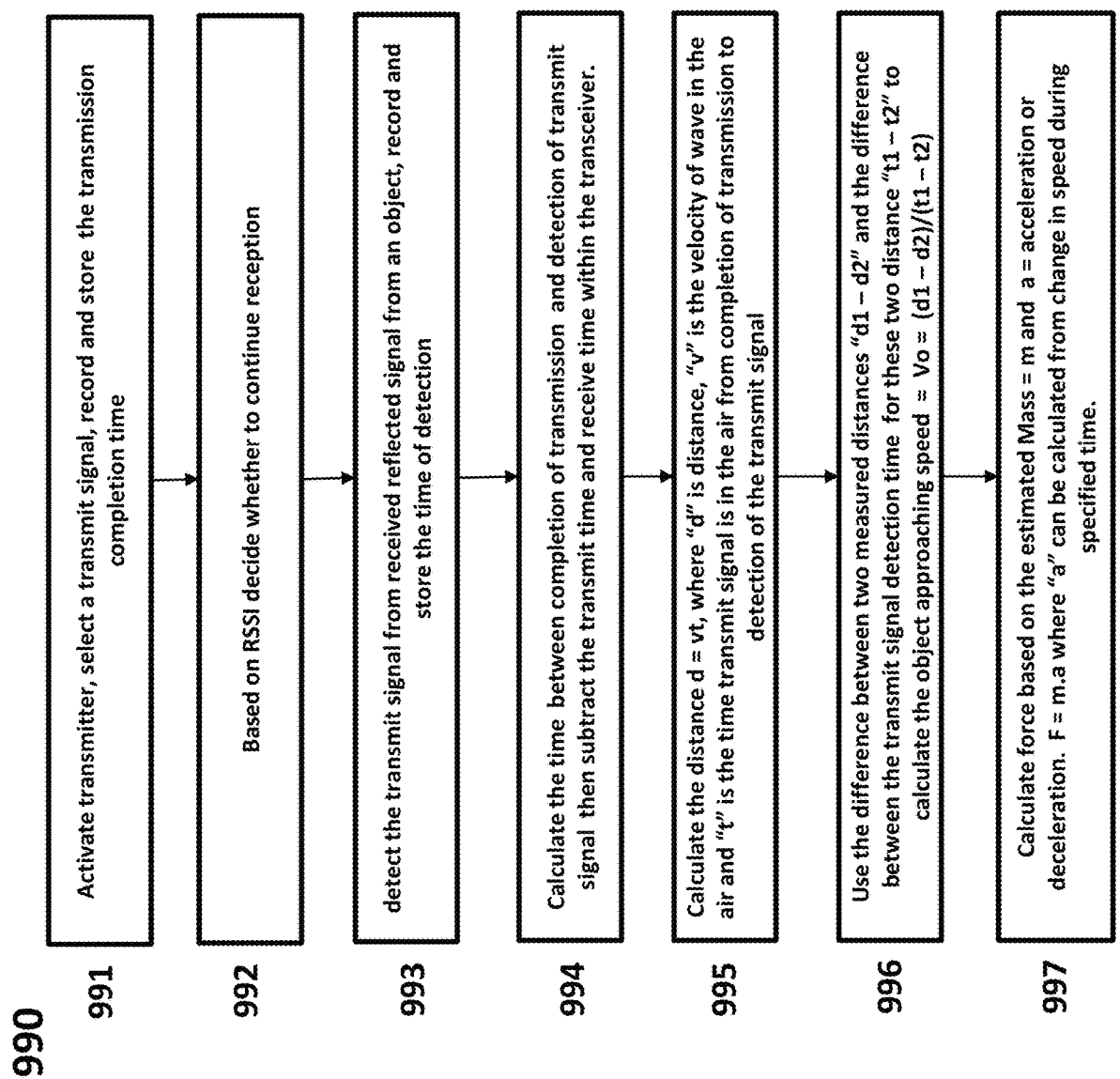
FIG. 15 depicts the process steps to calculate environmental parameters

FIG. 15 depicts an embodiment of method 990 for using a wireless sensor system 970 to estimate and calculate environmental parameters. In various embodiments, method 990 is carried out by processor and electrical circuit under the control of a processes or executable instructions. The readable and executable instructions reside, for example, in a data storage medium such as processor usable volatile and non-volatile memory. However, the readable and executable instructions may reside in any type of processor readable storage medium. In some embodiments, method 990 is performed at least by one of the circuits described herein.

At 991 of method 990, the transmitter is activated, a transmit signal is generated, the transmit signal is transmitted and a timing counter is initiated. For example, transmit signal is generated in control processor 979 and then is modulated in modulator 975 and up converted to radio frequency in transmitter 973 before being transmitted by transmit antenna 972. A time of completion of transmission is recorded and stored in control processor 979. The time of completion of transmission is adjusted for transmit circuits up to antenna port.

At 992 of method 990, after completion of transmission the receiver 974 is activated, the receiver 974 starts measurement of RSSI, compare it with pre-configured threshold, and the control processor 979 decides whether to continue with reception.

At 993 of method 990, the reflected transmit signal is detected in detector 978 and the detection time is recorded and stored in control processor 979. The detection time is adjusted for the travel time from antenna port to the detector.

At 994 of method 990, the traveling time of the transmit signal from transmit antenna 972, reflected from an object in the environment, and received at receiver antenna 971 is calculated. This is done by calculating the time between completion of transmission's time and the time detection of reflected transmit signal is completed. In the calculation the propagation time in the transmitter path and receiver path is taken into account.

At 995 of method 990, the control processor calculates the distance between an external object and the receive antenna 971. This is done by the formula d=vt/2, where "d" is distance, "v" is the velocity of wave in the air and "t" is the time transmit signal is in the air from completion of transmission to detection of the transmit signal.

At 996 of method 990, the control processor calculates the speed of an external object approaching the receive antenna 971. This is done by using the difference between two measured distances "d1−d2" and the difference between the transmitter signal detection times for these two distances "t1−t2". Then the control processor 509 calculates the object approaching speed using formula Vo=(d1−d2)/(t1−t2) where Vo is the approaching speed of the external object.

At 997 of method 990, the control processor 979 calculates the force from an external object. Control processor 979 calculates force based on the estimated Mass=m of the object and "a"=acceleration or deceleration of external object by using formula F=m·a where "a" can be calculated from change in speed during specified time.

Range imaging is the name for a collection of techniques that are used to produce a 2D image showing the distance to points in a scene from a specific point, normally associated with some type of sensor device. The resulting image, the range image, has pixel values that correspond to the distance. If the sensor that is used to produce the range image is properly calibrated the pixel values can be given directly in physical units, such as meters.

Visual images are formed via the projection of light from the three-dimensional world onto a two dimensional sensor. In an idealized pinhole camera, all points lying on a ray passing through the pin-hole will be projected onto the same image position. Thus, information about the distance to objects in the scene (i.e., range) is lost. Distance information can be recovered by measuring the changes in the appearance of the world resulting from change in viewing position.

Traditionally, this is accomplished via simultaneous measurements with two cameras at different positions, or via sequential measurements collected from a moving camera or object.

Three pillars of photography are Aperture, Shutter Speed and ISO. The camera's shutter speed, the lens's brightness (f-number), and the scene's luminance together determine the amount of light that reaches the sensor (the exposure). Exposure value (EV) is a quantity that accounts for the shutter speed and the f-number. Adjustment to the aperture controls the depth of field, the distance range over which objects are acceptably sharp; such adjustments need to be compensated by changes in the shutter speed.

In optics, the f-number (sometimes called focal ratio, or relative aperture) of an optical system is the ratio of the lens's focal length to the diameter of the entrance pupil.

Figure 16:
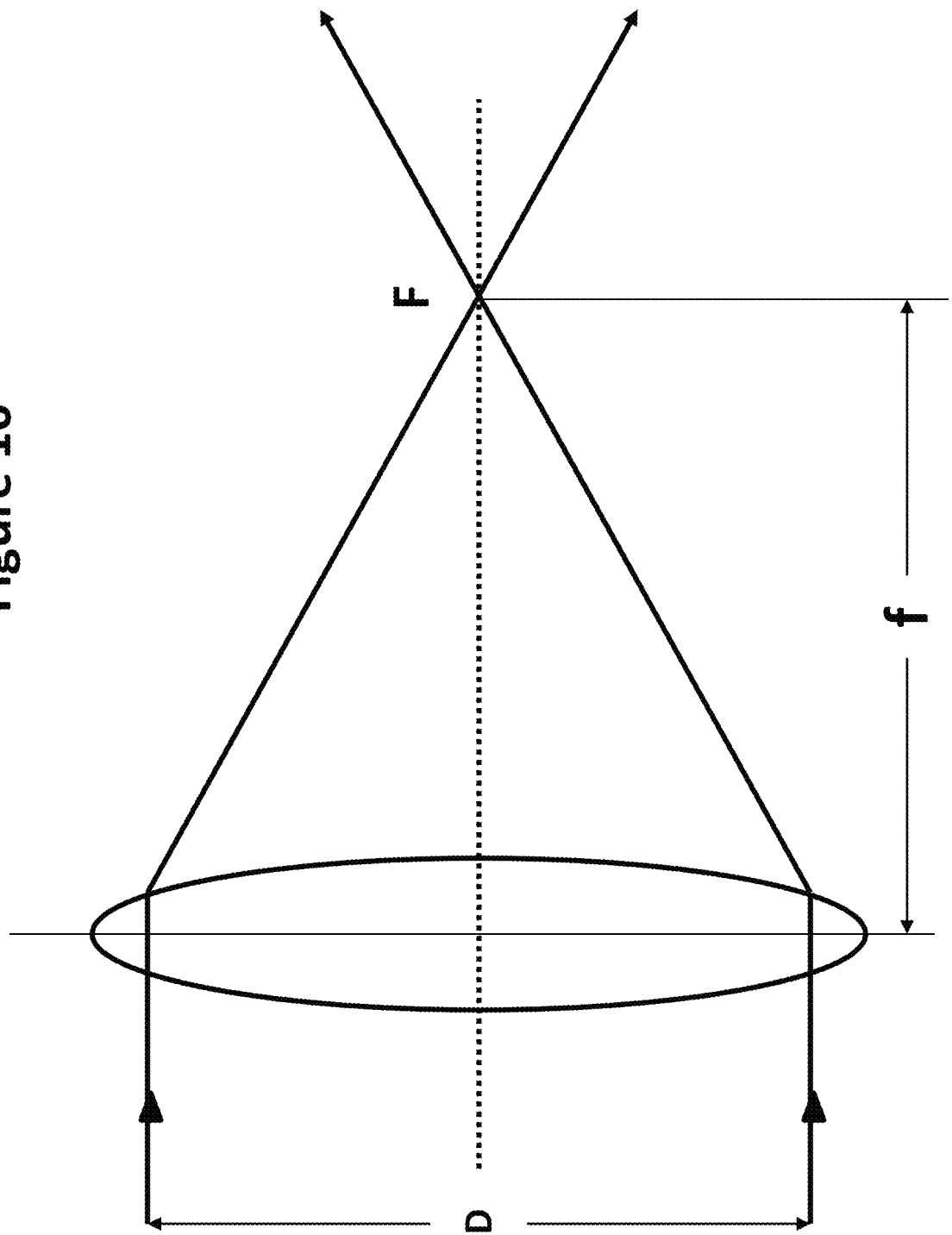
FIG. 16 shows the parameters of a lens

As shown in FIG. 16 the f-number N is given by:

$$N = \frac{f}{D}$$

where f is the focal length, and D is the diameter of the entrance pupil (effective aperture). It is customary to write f-numbers preceded by f/N, which forms a mathematical expression of the entrance pupil diameter in terms of f and N. For example, if a lens's focal length is 10 mm and its entrance pupil diameter is 5 mm, the f-number is 2 and the aperture diameter is f/2.

To maintain a consistent level of exposure, the shutter speed needs to be balanced with the aperture, and as one is increased, the other needs to decrease. For instance, smaller apertures (which let less light into the camera) require slower shutter speeds (to expose the sensor for longer). Wide apertures (more light) needs faster shutter speeds (less time) to produce the same exposure.

ISO stands for International Standards Organization, and it is a standardized industry scale for measuring sensitivity to light. This can be used in relation to how sensitive a sensor is to light, but more commonly today, it pertains to the sensitivity of a digital image sensor. ISO is measured in numbers, with the lowest number being the least sensitive to light, (e.g. ISO 50 or 100), and the highest number being the most sensitive to light, (e.g. ISO 6400). The higher the ISO the lower the amount of time a shutter needs to be open. Almost all digital cameras today allow you some control over your ISO settings, so it is important to know what it is, and what effect it has on your images.

The simplest formula to estimate distance to the object is pinhole projection formula:

$$\frac{x}{f} = \frac{X}{d}$$

Where x is the size of the object on the sensor, f is focal length of the lens, X is the size of the object, and d is distance from nodal point to the object. x and f, and X and d are measured in the same units, e.g. mm and m respectively. To calculate x one will need to estimate pixel size for the sensor; for example, for Pentax K20D it is 23.4 mm/4672 pixels≈5.008e-3 mm/pixel, i.e. a 100 pixels long image corresponds to x=500.08e-3 mm.

In the following, it is assumed that the size of the object (X) is unknown, and the only known parameters are x (image size) and f (focal length). The problem is that one cannot tell from one photo if a small object is very close to the camera or a big object far away, because the depth of field in landscape shots is usually very big (and that's why pinhole formula is applicable).

To solve this problem one may use two or more images to measure the distance. Provided one can measure all angles and distance between two camera positions, then it is possible to calculate distance to the remote object. But measuring all angles is not an easy task.

An easier approach is to take two photos which stay on the same line with the object, and the object in the center of the image. Let's assume the distance to the object on the first photo at time $t_0$ is $d_1$, and image size is $x_1$:

$$x_1/f = X/d_1 \quad (1)$$

Then if the image sensor moves towards the object with speed of "v", on the second photo after $t_1$ time passed, the image size is $x_2$ slightly bigger than $x_1$:

$$x_2/f = X/d_2 \quad (2)$$

From equations (1), and (2) one has;

$$x_1 * d_1 = x_2 * d_2 \quad (3)$$

In the case of stationary object, considering the speed that the sensor approaches the object one has;

$$d_1 - d_2 = v * t_1 \quad (4) \text{ therefore,}$$

$$x_1 * d_1 - x_2 * d_1 = -x_2 * v * t_1 \quad (5) \text{ or}$$

$$d_1 = x_2 * v * t_1 / (x_2 - x_1) \quad (6) \text{ and}$$

$d_2$ can be obtain from equation (3).

If either the sensor or object or both are moving and we do not know the speed of neither of them, then we have two options;

1. use other means like GPS, speedometer (when mounted on automobiles, bicycles, motorbikes, etc.), wireless radio sensor, or other techniques (similar to what is used in helicopters, drone, airplane or etc.) to obtain the approaching speed of the object or
2. use typical objects in an environment then create an image verification data base and a distance calibration data base that relates the size of the image to distance of the object from the image sensor.

In the second approach, once Δd is estimated at two different times spaced by Δt, then Δd and Δt are used to calculate the speed. This speed can be used in equation 6 to recalculate distance.

Figure 17:
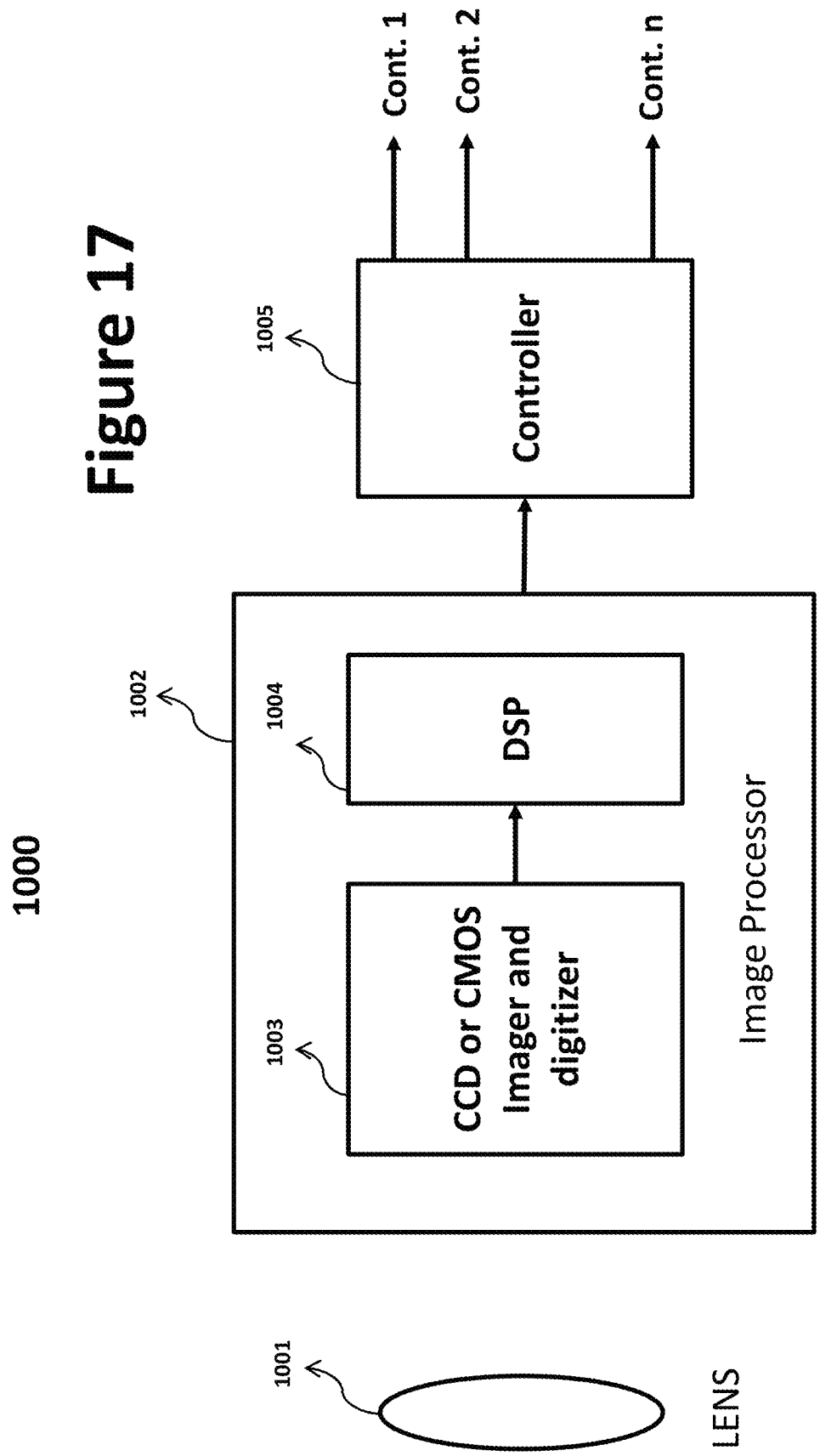
FIG. 17 shows an embodiment of an image sensor

FIG. 17 depicts an embodiment of image sensor 1000. In general, image sensor 1000 facilitates estimation and calculation of certain parameters of environment by using the images from the environment. The images are produced through a lens 1001 and an image processor 1002 which comprises of an imager/digitizer 1003 and a DSP (digital signal processor) 1004. The image is processed in DSP 1004 to identify an external object. Then through use of the pixels from multiple images and multiple lenses independently the approaching speed and distance of an object from image sensor are estimated. The speed and distance information is passed to a controller 1005 to decide what function or device has to be activated.

Image sensor system 1000 includes, among other things, control processor 1005, image processor 1002 and lens 1001.

In one embodiment, control processor 1005, image processor 1002 and lens 1001 are components of image sensor 1000 that could be used for various applications. For example, it can be used in robotics, guided and automated systems, automated automobiles, helmets, body armor worn by human or robot, traffic monitoring, flying car, any equipment or device that allows a human or robot to fly from point "A" to point "B", and etc.

In one embodiment, image sensor 1000 is calibrated for distance. Calibration is achieved by using various objects with different and specific shapes at different known distances from image sensor 1000. The calibration information is used to create a distance calibration data base (matrix) and stored in the DSP 1004 or control processor 1005.

Control processor 1005 is for processing information data received from image processor 1002. Control processor 105 typically utilizes appropriate hardware and software algorithm to properly process information data.

In one embodiment, control processor 1005 uses time of day to define an absolute time for collecting image data in image sensor 1000.

In one embodiment, the imager/digitizer of image sensor 1000 is of CCD or CMOS type.

In one embodiment, the image sensor uses the information from pixels that belong to an identified object produced from one or more imagers and lenses to estimate some parameters of the environment.

In one embodiment, the DSP 1004 has a variety of functions. In general, DSP 1004 and the distance calibration data base (matrix) are utilized for signal processing, calculation, estimation of environmental parameters.

Control Processor 1005 has a variety of functions. In general, control processor 1005 is utilized for activities, methods, procedures, and tools that pertain to the operation, administration, maintenance, and provisioning of image sensor. In one embodiment, control processor 1005 includes a database that is used for various applications. The database can be utilized for analyzing statistics in real-time.

Control processor 1005 also has a variety of thresholds, tables, calibration data and distance calibration data base (matrix, measurement information, etc) stored in the control processor memory or a removable memory card which is similar to a subscriber identity module (SIM) card. In general, control processor 1005 provides control to various functions and devices. Moreover, control processor 1005 is a high capacity communication facility that connects primary nodes.

In one embodiment, an image sensor 1000 can be worn by human and robots.

Figure 18:
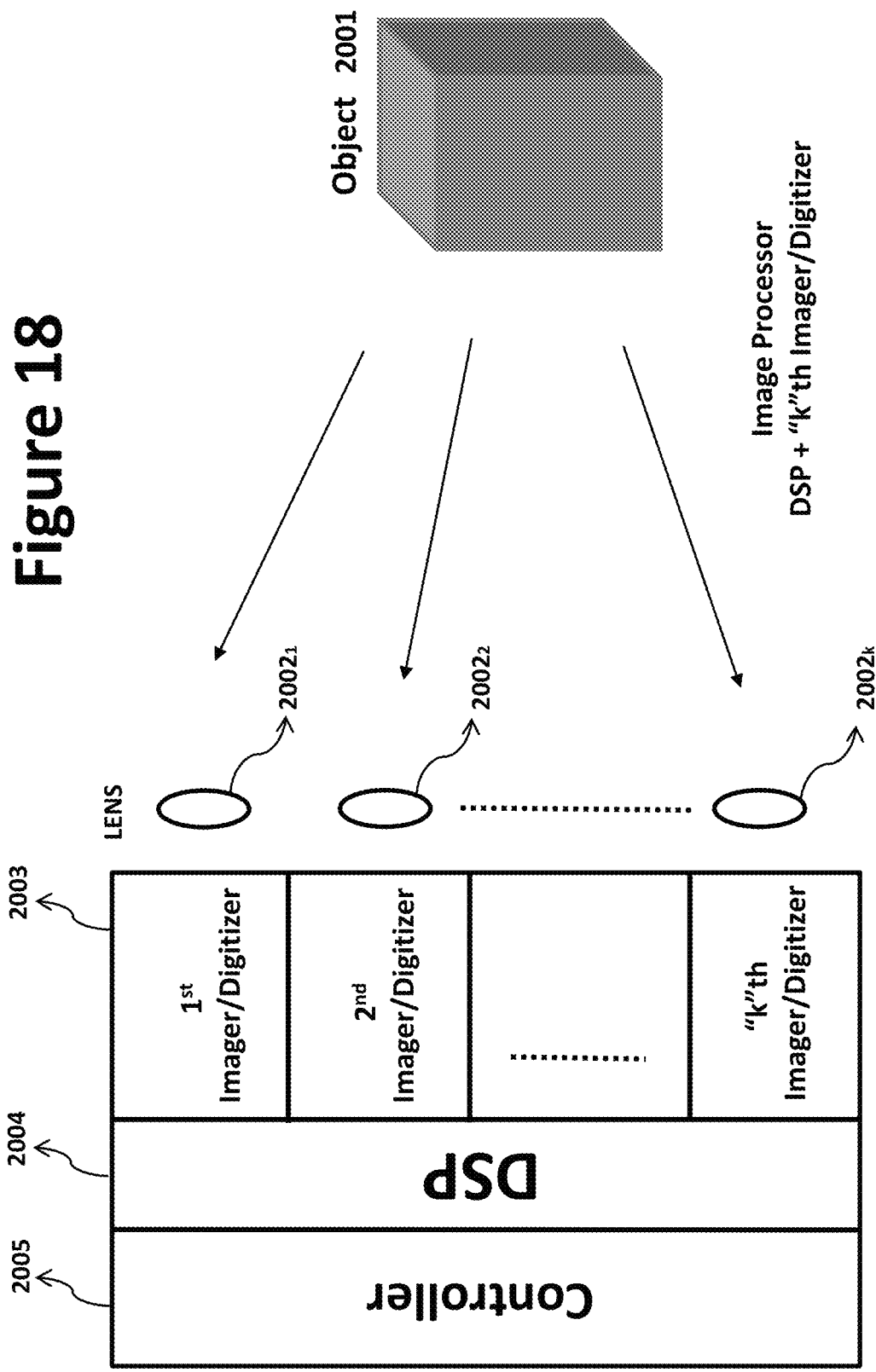
FIG. 18 shows an embodiment of image sensor interaction with an object in its surrounding environment

FIG. 18 depicts an embodiment of image sensor system 2000 interactions with one object in its surrounding environment. In general, image sensor system includes controller 2005, DSP 2004, "k" Imager/digitizer 2003, and lenses $2002_1$ to $2002_k$.

In another embodiment of image sensor system 2000 used by a moving or flying vehicle/object is calibrated for distance using a number of measurements to create a distance calibration data base (matrix) that relates the image size to distance of the object from the image sensor.

Controller 2005 request information from one of imager/digitizers 2003 by sending an activation signal. The imager/digitizer receives the activation signal and record an image from external object 2001 in its surrounding environment.

In one embodiment of image sensor system 2000 used by a moving or flying vehicle/object, DSP 2004 processes the recorded images from one or more lenses in conjunction with the stored distance calibration data base (matrix) and extracts the needed information data to estimate the required parameters from object 2001 to send to controller 2005. The controller 2005 uses the information data received from DSP 2004 to decide which function or device needs to be activated.

In one embodiment of image sensor system 2000 used by a moving or flying vehicle/object, the image sensor's distance calibration data base (matrix) and pixels in the object's image are used to estimate and calculate a distance of the object in surrounding environment from image sensor and an approaching speed of the object towards image sensor.

Figure 19:
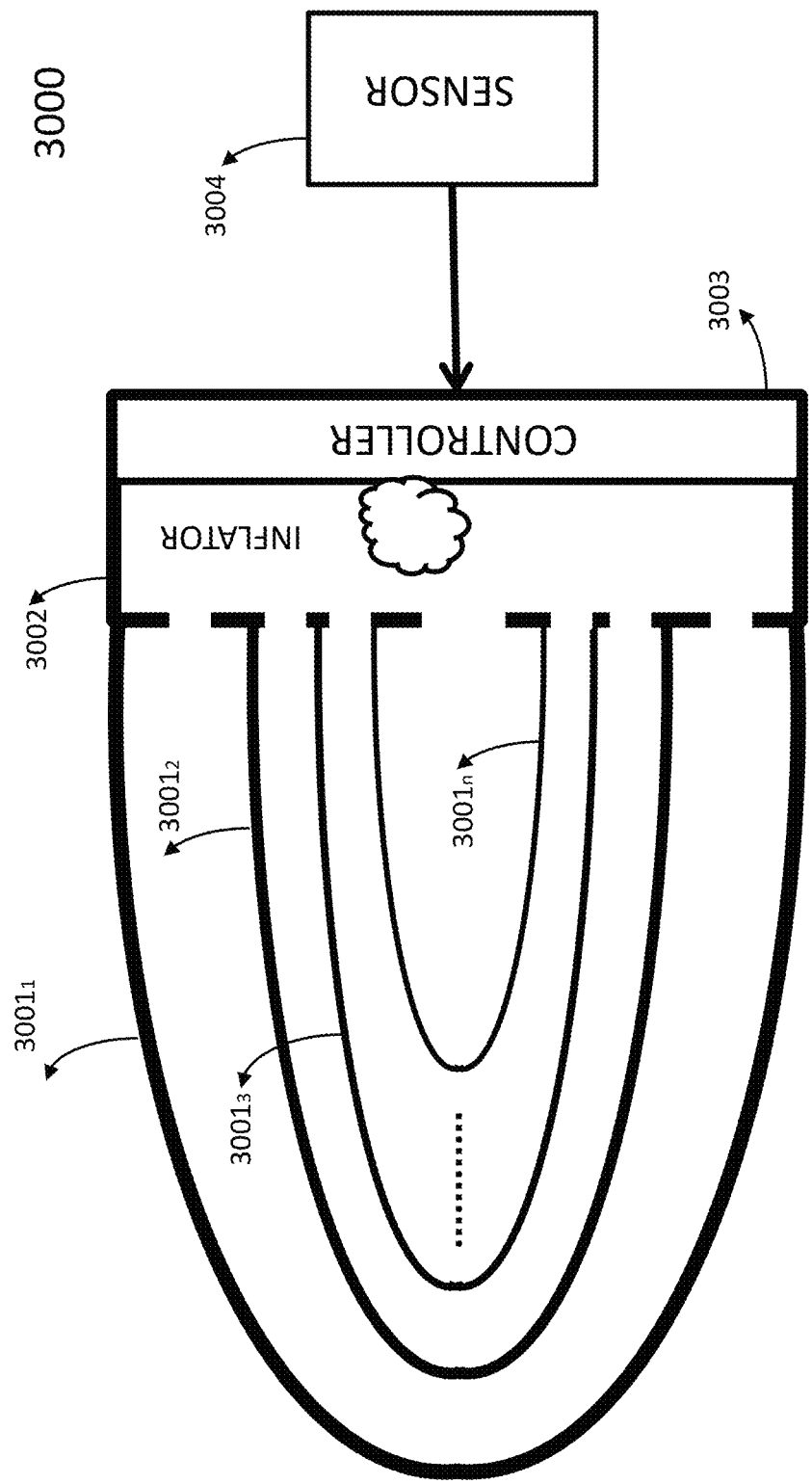
FIG. 19 shows a multilayer airbag system

FIG. 19 illustrates an embodiment of a multilayer airbag 3000. In general, the multilayer airbag 3000 provides protection by inflating "n" airbags that are within one another (nested airbag). When sensor 3004 detects an approaching object to the multilayer airbag protection system, it sends a detection information data to the controller 3003. The controller 3003 based on the detection information data and other available data decides to activate the inflator 3002 to inflate airbags $3001_1$ to $3001_n$.

Multilayer airbag 3000 includes, among other things, sensor 3004, controller 3003, inflator 3002, and "n" airbags $3001_1$ to $3001_n$ that are within each other (nested).

In one embodiment, the sensor 3004 can be at least one of image sensor, wireless sensor, radar, heat sensor, speed sensor, acceleration sensor, ultrasonic sensor, proximity sensor, pressure sensor, G sensor, and IR (infrared) sensor.

In one embodiment of multilayer airbag 3000, the controller 3003 provides the firing driver for the inflator 3002 gas generator, monitors operation of the multilayer airbag, and indicates any malfunction.

In one embodiment of multilayer airbag 3000, the inflator 3002 inflates multilayer airbag $3001_1$ to $3001_n$ based on the activation it receives from controller 3003 by producing a large pulse of hot nitrogen gas.

In one embodiment of multilayer airbag 3000, the airbag $3001_2$ resides inside airbag $3001_1$, the airbag $3001_3$ resides inside airbag $3001_2$, and ultimately airbag $3001_n$ resides inside airbag $3001_{n-1}$.

In one embodiment of multilayer airbag 3000, the airbag $3001_2$ inflates within airbag $3001_1$, the airbag $3001_3$ inflates within airbag $3001_2$, and ultimately airbag $3001_n$ inflates within airbag $3001_{n-1}$.

In one embodiment of the multilayer 3000, airbag $3001_1$ to $3001_n$ provide "n" layer of redundancy.

In one embodiment of multilayer airbag 3000, the controller 3003 activates the inflator 3002 based on at least one of the information it receives from the sensor 3004, the central brain or artificial intelligence (AI) of the moving or flying vehicle/object that uses multilayer airbag 3000, and other entities (for example an operating person).

In one embodiment of multilayer airbag 3000, the controller 3003 acts as the main brain or artificial intelligence and activates the inflator 3002 based on the information it receives from the sensor 3004 and other sensors of the moving or flying vehicle/object that uses multilayer airbag 3000.

Figure 20A:
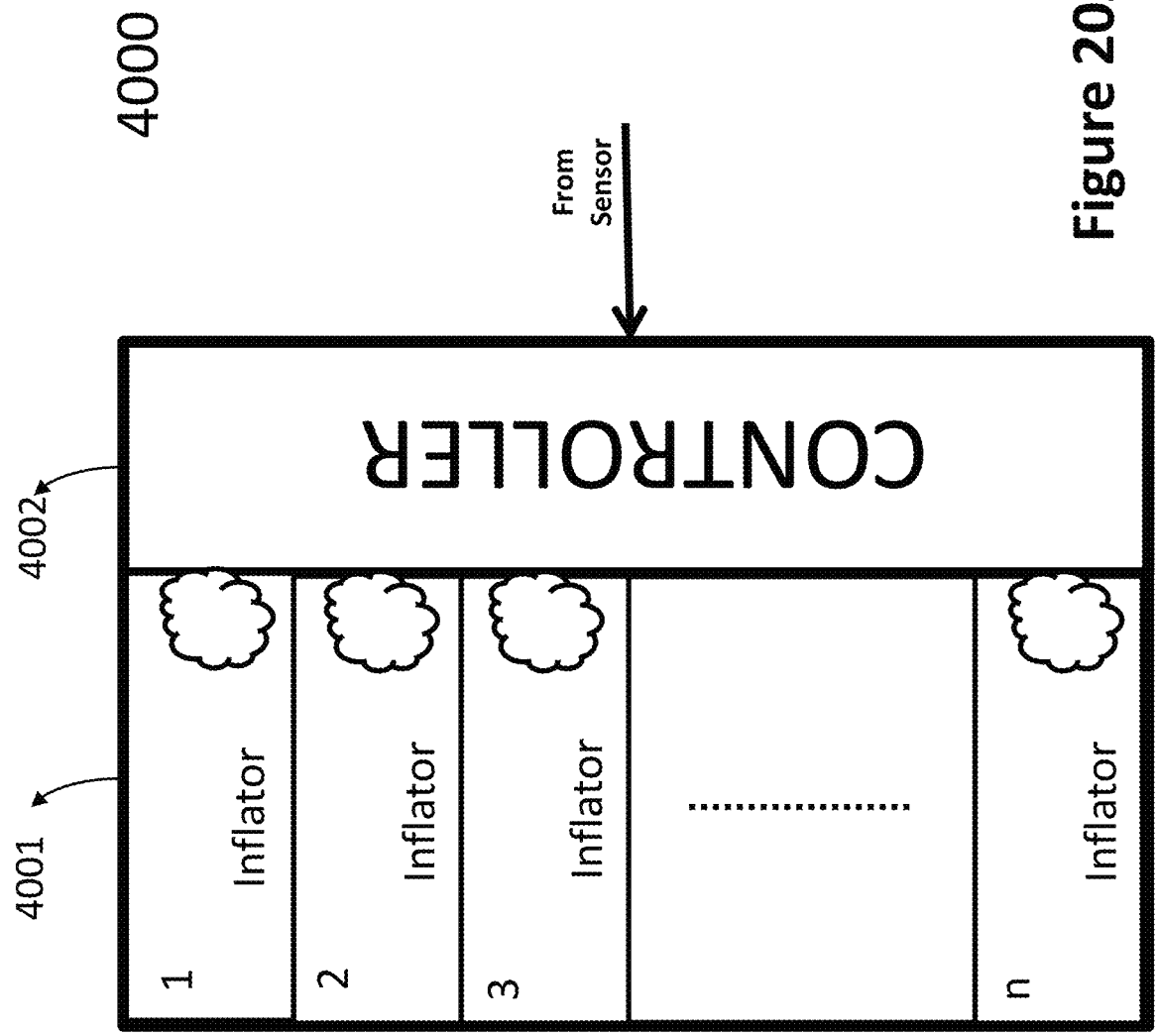
FIG. 20A through 20C shows an embodiment of a plurality of inflators

FIG. 20A depicts an embodiment of multilayer airbag inflator system 4000. In general the inflator system 4000 inflates "n" airbags independently.

The multilayer airbag inflator system 4000 includes, among other things, controller 4002, and inflator 4001.

In one embodiment of inflator system 4000, the inflator 4001 consists of "n" independent inflator each assigned to one of the airbags within multilayer airbag $3001_1$ to $3001_n$.

In one embodiment of inflator system 4000, the controller 4002 activates the "n" inflators of the inflator 4001 simultaneously.

In another embodiment of inflator system 4000, the controller 4002 activates the "n" inflators of inflator 4001 with a specific time sequence.

In another embodiment of inflator system 4000, the controller 4002 activates a subset of "n" inflators of inflator 4001 either simultaneously or with a specified time sequence based on predefined configuration parameters stored in controller 4002.

In another embodiment of inflator system 4000, the controller 4002 receives the activation information data from sensor 4004 and other entities.

Figure 20B:
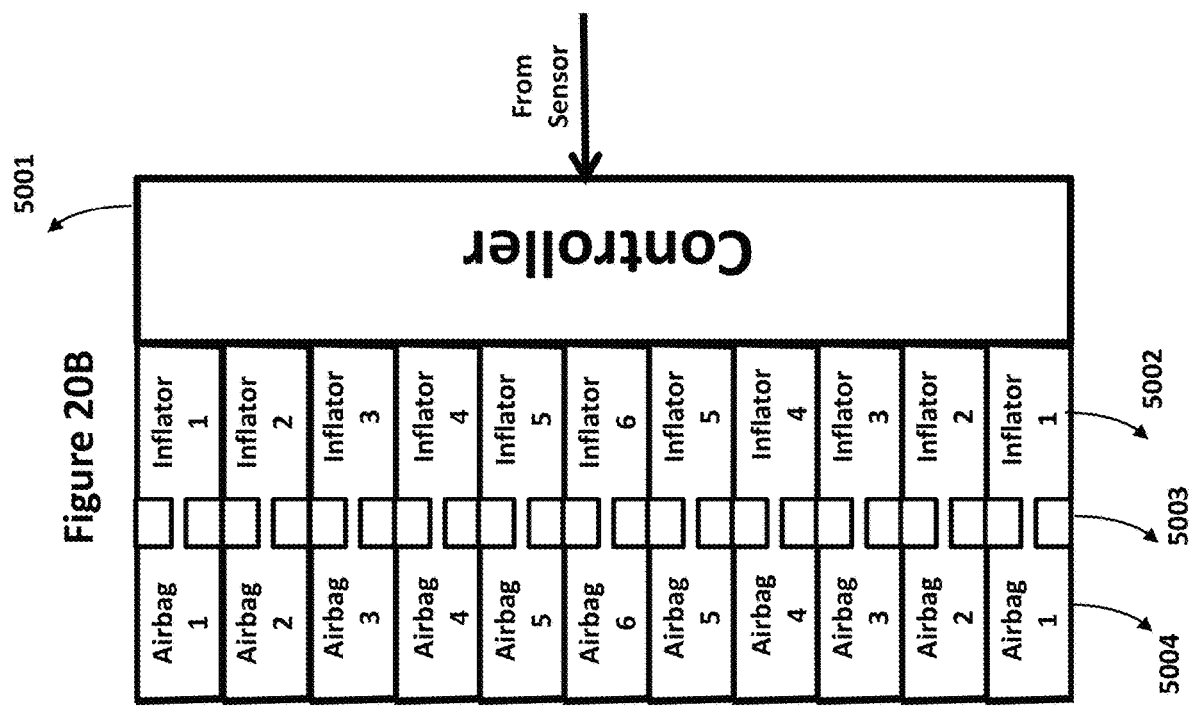
Figure 20C:
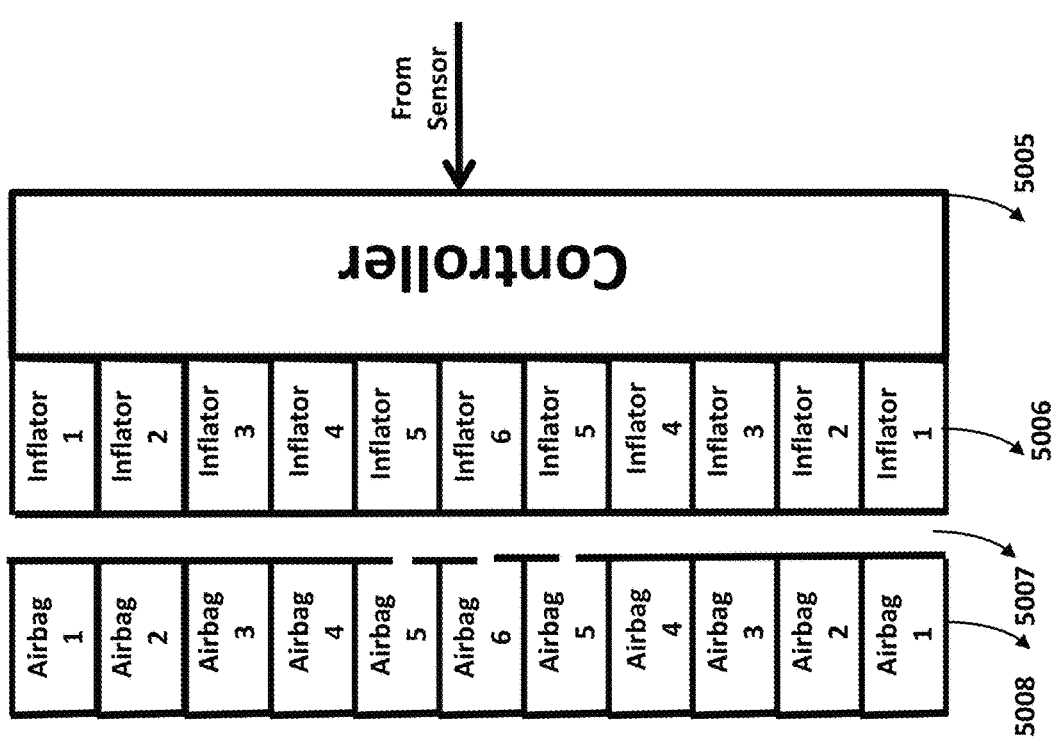

FIGS. 20B and 20C depict multilayer airbag inflating and deflating structure 5000. In general inflating structure 5000 shown in FIG. 20B designate an inflator to each airbag 5004 and inflates each airbag 5004 independently starting from last nested airbag. In the example shown in FIG. 20B which consists of 6 nested airbags 5004, first airbag 6 which is the smallest and last nested airbag is inflated and the outer or first airbag is inflated last. During inflation each inflator uses its dedicated air tunnel to inflate its assigned airbag.

In one embodiment, controller 5001 receives an information data from a sensor, evaluates the information data, and determines if the airbags or subset of airbags need to be inflated.

In another embodiment, when a subset of the airbags are inflated the one that are not inflated are the last one. For example airbag 6 in FIG. 20B is not inflated or airbags 6 and 5 are not inflated.

In another embodiment, when a subset of the airbags are inflated the gas for the airbags that are not inflated is routed to the first airbag that is inflated. For example if airbags 6 and 5 are not inflator then the gas from inflator 6 and 5 are routed to inflator 4 through the tunnel 5003. In other words all inflators are always activated.

In another embodiment, controller 5001 based on a time sequence stored in its memory activates inflators 5002 starting from inflator 6 for nested airbag 6 and ending with inflator 1 or outer airbag 1 using each airbag dedicated air or gas tunnel 5003.

FIG. 20C depict the deflating mechanism after impact. The deflating after impact also starts with last airbag. For example if airbags 5 and 6 are deflated then their air or gas is released through the air tunnel which blocked for other airbags to release air as shown by air tunnel 5007.

In one embodiment, when the last and smallest airbags are deflated and collapsed the bigger and outer airbags also partially collapse and protect a wider area. For example if airbag 6 or 5 and 6 are deflated and fully collapsed then airbags 1, 2, 3, and 4 partially collapse and cover a wider area.

FIG. 21 shows an embodiment of expandable pad 6000. In general expandable pad 6000 is a polymer that expands when a voltage is applied at its two ends.

The expandable pad 6000 includes, among other things a voltage generator which applies a defined voltage across two ends of the pad.

In one embodiment of expandable pad 6000, the pad 6001 consists of a polymer with certain thickness.

In one embodiment of expandable pad 6000, the pad 6002 is the pad 6001 when expanded after a voltage is applied to its two ends to increase and expanded its thickness.

Figure 22:
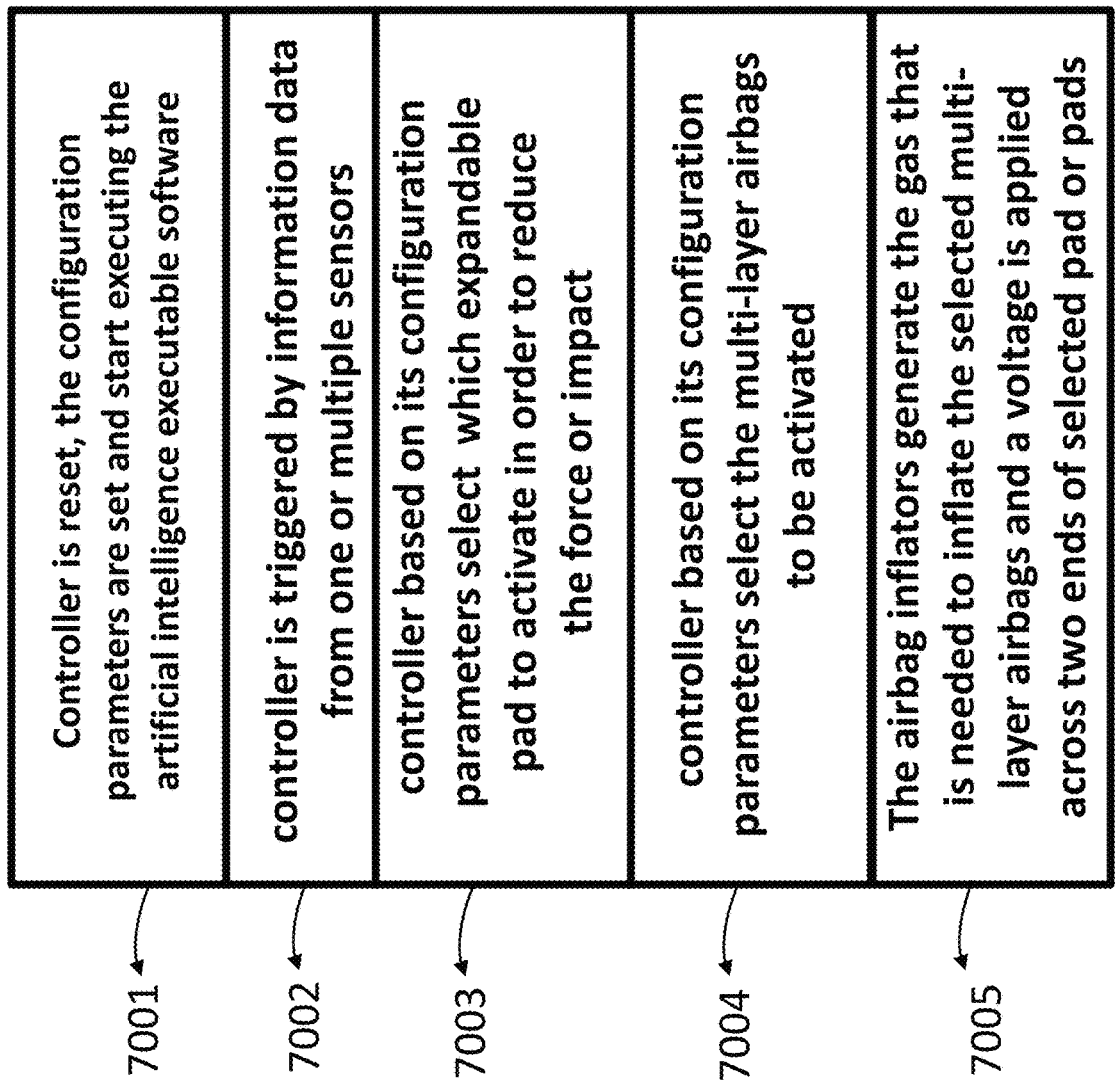
FIG. 22 depicts an embodiment of a method for using multilayer airbag and expandable pad to protect a moving object The drawings referred to in this description should be understood as not being drawn to scale except if specifically noted.

FIG. 22 depicts an embodiment of method 7000 for using multilayer airbag and expandable pad to protect a moving or flying vehicle/object. In various embodiments, method 7000 is carried out by sensor, expandable pads, multilayer airbag and controller under the control of processes or executable instructions. The readable and executable instructions reside, for example, in a data storage medium such as processor usable volatile and non-volatile memory. However, the readable and executable instructions may reside in any type of processor readable storage medium. In some embodiments, method 7000 is performed at least by one of the circuits described herein.

At 7001 of method 7000, controller resets, sets the configuration parameters and start executing the artificial intelligence executable software.

At 7002 of method 7000, controller using its artificial intelligence executable software to analyze the information data from one or multiple sensors to detect any potential or imminent impacts due to approaching objects, falling, or crash.

At 7003 of method 7000, the controller based on its configuration parameters select which expandable pad or compressed air unit to activate in order to reduce the force due to impact.

At 7004 of method 7000, the controller based on its configuration parameters selects the multilayer airbags to be inflated and activates the inflators of the airbags.

At 7005 of method 7000, the airbag inflators generate the gas that is needed to inflate the selected multilayer airbags and a voltage is applied across two ends of selected expandable pads.

Various embodiments are thus described. While particular embodiments have been described, it should be appreciated that the embodiments should not be construed as limited by such description, but rather construed according to the following claims.

The invention claimed is:

1. An Internet of Things (IoT) device in a smart environment comprising:
   a transceiver to communicate with at least one of a fourth generation cellular network (4G), a fifth generation cellular network (5G), a sixth generation cellular network (6G), and a wireless fidelity network (WiFi);
   said transceiver obtains a time of day (TOD) from at least one of a primary synchronization sequence (PSS), and a secondary synchronization sequence (SSS) of an orthogonal frequency division multiplexing (OFDM) downlink transmit symbol of at least one of said 4G, said 5G, and said 6G;
   said PSS and said SSS use 62 subcarriers of 72 subcarriers assigned to said PSS and said SSS in said OFDM downlink transmit symbol;
   said TOD is sent by one or more of an unused subcarrier of at least one of said PSS and said SSS; and
   said IoT device is at least one of a flying object, a moving object, a stationary object, and a data collecting device in said smart environment and uses said TOD to synchronize its activities with at least one of said 4G, said 5G, said 6G, and said WiFi.

2. The IoT device explained in claim 1, wherein said unused sub-carriers are at each end of said PSS and said SSS.

3. The IoT device explained in claim 1, wherein using said unused sub-carriers to send said TOD to said IoT device is unidirectional.

4. The IoT device explained in claim 1, wherein said TOD is corrected for a travel time between time of insertion of the TOD in said unused sub-carrier and arrival time of said unused sub-carrier at an antenna port.

5. The IoT device explained in claim 1, wherein said time of day is incremented before sending to said IoT device.

6. The IoT device explained in claim 1, wherein said IoT device that communicates with said 4G, said 5G, or said 6G adjusts the TOD by a time alignment or a time advance in order to remove any said TOD error.

7. The IoT device explained in claim 1, wherein said time of day is used to provide an absolute time for start and end of various activities of said stationary object, said flying object, said moving object, and said data collecting device.

8. The IoT device explained in claim 7, wherein said absolute time is first microsecond in a millisecond, or nth microsecond from start of said millisecond in said time of day.

9. The IoT device explained in claim 1, wherein said IoT device uses said time of day to synchronize, schedule and control activities of said data collecting device, said stationary object, said flying object, and said moving object in said smart environment.

10. The IoT device explained in claim 1, wherein said time of day allows said stationary objects, said flying objects, said moving objects, and said data collecting devices in the smart environment to be time synchronized, and configured and scheduled to operate synchronously, freely, with no interruption, interference and collision.

\* \* \* \* \*